(12) United States Patent
Meszaros et al.

(10) Patent No.: US 10,535,045 B2
(45) Date of Patent: Jan. 14, 2020

(54) CUSTOMIZED RETAIL SEND TRANSACTION METHOD AND SYSTEM

(71) Applicant: MoneyGram International, Inc., Minneapolis, MN (US)

(72) Inventors: Richard T. Meszaros, Bloomington, MN (US); Eric James Sander, Mendota Heights, MN (US); Yassir Zouiten, Lakewood, CO (US)

(73) Assignee: MONEYGRAM INTERNATIONAL, INC., Minneapolis, MN (US)

( * ) Notice: Subject to any disclaimer, the term of this patent is extended or adjusted under 35 U.S.C. 154(b) by 28 days.

(21) Appl. No.: 15/486,450

(22) Filed: Apr. 13, 2017

(65) Prior Publication Data

US 2017/0221025 A1    Aug. 3, 2017

Related U.S. Application Data

(60) Continuation of application No. 14/805,890, filed on Jul. 22, 2015, now Pat. No. 9,626,665, which is a
(Continued)

(51) Int. Cl.
*G06Q 20/00* (2012.01)
*G06Q 20/10* (2012.01)
(Continued)

(52) U.S. Cl.
CPC ......... *G06Q 20/102* (2013.01); *G06Q 20/02* (2013.01); *G06Q 20/0457* (2013.01);
(Continued)

(58) Field of Classification Search
USPC ........................................................ 235/380
See application file for complete search history.

(56) References Cited

U.S. PATENT DOCUMENTS

| 5,420,405 A | 5/1995 | Chasek |
| 5,659,165 A | 8/1997 | Jennings et al. |
(Continued)

FOREIGN PATENT DOCUMENTS

| GB | 2370146 A | 6/2002 |
| WO | 2005114543 A2 | 12/2005 |
| WO | 2011082125 A2 | 7/2011 |

OTHER PUBLICATIONS

The International Search Report and Written Opinion dated Aug. 18, 2011 in connection with International Patent Application No. PCT/US2010/062128.
(Continued)

*Primary Examiner* — Daniel A Hess
(74) *Attorney, Agent, or Firm* — Dorsey & Whitney LLP

(57) ABSTRACT

A system and method for performing customized money transfer send transactions uses a computer system connectable to receive data representing a send transaction identifier of at least one token. The computer system presents to the sender a completion interface that includes fields for receiving sender identification information, recipient identification information and a notification method, and message options related to the transaction. In response to receipt of sufficient information entered at the completion interface, an active, funded send transaction record is stored in the computer system including the message options for recipient notification.

23 Claims, 15 Drawing Sheets

Related U.S. Application Data division of application No. 12/650,209, filed on Dec. 30, 2009, now Pat. No. 9,092,763.

(51) Int. Cl.

| | |
|---|---|
| *G06Q 20/04* | (2012.01) |
| *G06Q 20/18* | (2012.01) |
| *G06Q 20/20* | (2012.01) |
| *G06Q 20/28* | (2012.01) |
| *G06Q 20/34* | (2012.01) |
| *G06Q 30/06* | (2012.01) |
| *G07F 7/08* | (2006.01) |
| *G07F 17/42* | (2006.01) |
| *G06Q 20/02* | (2012.01) |

(52) U.S. Cl.
CPC ............ *G06Q 20/10* (2013.01); *G06Q 20/18* (2013.01); *G06Q 20/20* (2013.01); *G06Q 20/204* (2013.01); *G06Q 20/28* (2013.01); *G06Q 20/346* (2013.01); *G06Q 20/348* (2013.01); *G06Q 20/3552* (2013.01); *G06Q 30/06* (2013.01); *G07F 7/08* (2013.01); *G07F 17/42* (2013.01)

(56) References Cited

U.S. PATENT DOCUMENTS

| | | | |
|---|---|---|---|
| 5,825,003 A | 10/1998 | Jennings et al. | |
| 5,956,700 A | 9/1999 | Landry | |
| 5,963,647 A | 10/1999 | Downing et al. | |
| 6,012,048 A | 1/2000 | Gustin et al. | |
| 6,039,250 A | 3/2000 | Ito et al. | |
| 6,173,272 B1 | 1/2001 | Thomas et al. | |
| 6,267,292 B1 | 7/2001 | Walker et al. | |
| 6,317,745 B1 | 11/2001 | Thomas et al. | |
| 6,488,203 B1 | 12/2002 | Stoutenburg et al. | |
| 6,502,747 B1 | 1/2003 | Stoutenburg et al. | |
| 6,547,132 B1 | 4/2003 | Templeton et al. | |
| 6,554,184 B1 | 4/2003 | Amos | |
| 6,609,113 B1 | 8/2003 | O'Leary et al. | |
| 6,736,314 B2 | 5/2004 | Cooper et al. | |
| 6,761,309 B2 | 7/2004 | Stoutenburg et al. | |
| 6,761,311 B1 | 7/2004 | Algiene et al. | |
| 6,769,605 B1 | 8/2004 | Magness | |
| 6,814,282 B2 | 11/2004 | Seifert et al. | |
| 6,827,260 B2 | 12/2004 | Stoutenburg et al. | |
| 6,886,742 B2 | 5/2005 | Stoutenburg et al. | |
| 7,120,608 B1 | 10/2006 | Gallagher et al. | |
| 7,188,762 B2 | 3/2007 | Goade, Sr. et al. | |
| 7,258,268 B2 | 8/2007 | Steiger, Jr. | |
| 7,641,109 B2 | 1/2010 | Seifert et al. | |
| 7,959,065 B2 | 6/2011 | Rosenblatt et al. | |
| 8,152,054 B2 | 4/2012 | Bulawa et al. | |
| 8,336,768 B2 | 12/2012 | Bulawa et al. | |
| 9,092,763 B2 | 7/2015 | Meszaros et al. | |
| 9,626,665 B2 | 4/2017 | Meszaros et al. | |
| 2003/0083987 A1 | 5/2003 | Stoutenburg et al. | |
| 2003/0110129 A1 | 6/2003 | Frazier et al. | |
| 2003/0130907 A1* | 7/2003 | Karas ............... G06Q 10/101 705/26.1 |
| 2003/0150142 A1 | 8/2003 | Street | |
| 2003/0169881 A1 | 9/2003 | Niedermeyer | |
| 2003/0208439 A1 | 11/2003 | Rast | |
| 2003/0222135 A1 | 12/2003 | Stoutenburg et al. | |
| 2004/0139000 A1 | 7/2004 | Amos | |
| 2004/0143552 A1 | 7/2004 | Weichert et al. | |
| 2004/0177014 A1 | 9/2004 | Cowell | |
| 2004/0205023 A1 | 10/2004 | Hafer et al. | |
| 2004/0205138 A1 | 10/2004 | Friedman et al. | |
| 2004/0254859 A1* | 12/2004 | Aslanian, Jr. ........ G06Q 10/107 705/14.73 |
| 2005/0209958 A1 | 9/2005 | Michelsen et al. | |
| 2006/0054683 A1 | 3/2006 | Michelsen et al. | |
| 2006/0085335 A1 | 4/2006 | Crawford et al. | |
| 2006/0191994 A1 | 8/2006 | Steiger, Jr. | |
| 2006/0206421 A1 | 9/2006 | Knapp | |
| 2007/0005498 A1 | 1/2007 | Cataline et al. | |
| 2007/0124242 A1 | 5/2007 | Reis, Jr. | |
| 2008/0033877 A1 | 2/2008 | Blair et al. | |
| 2008/0114697 A1 | 5/2008 | Black et al. | |
| 2008/0140568 A1 | 6/2008 | Henry | |
| 2017/0364881 A1 | 12/2017 | Meszaros et al. | |

OTHER PUBLICATIONS

MoneyGram International Inc. MoneyGram® e Money Transfer. Printout of computer screen images of product electronic commerce documents. 1995. 109 pages.

\* cited by examiner

FIGURE 9

| Transaction Identifier 902 | Product Type 904 | Sender Information 906 | Recipient Information 908 | Active/ Inactive 910 | Funded/ Unfunded 912 | Delivery Features 914 | Other Retail Data 916 |
|---|---|---|---|---|---|---|---|
| alphanumeric | Name/code Amount Jurisdiction | Name Address Tel. no. E-mail Identification | Name Address Tel. no. E-mail Q/A | code | code (can indicate pre-payment) | Descriptive text/codes (messages, images for deliverables) | POS date/time stamp, internal audit data, regulatory data | ial vehicle for transferring money. That is, when a customer uses a money transfer system, he/she typically thinks only of the purpose to transfer money from himself/herself to another individual that needs money or to an individual or business to which the customer owes money. This limited view of money transfer systems may be due in part to the agent office or service counter context at which money transfer systems are presented to and interact with the customer, and the lack of money transfer purchasing capabilities in traditional retail purchase contexts.

CUSTOMIZED RETAIL SEND TRANSACTION METHOD AND SYSTEM

CROSS-REFERENCE TO RELATED APPLICATIONS

This application is a continuation of U.S. patent application Ser. No. 14/805,890, filed Jul. 22, 2015, entitled RETAIL SEND TRANSACTION SYSTEM, issuing Apr. 18, 2017, as U.S. Pat. No. 9,626,665, which is a division of U.S. patent application Ser. No. 12/650,209, filed Dec. 30, 2009, entitled RETAIL SALE MONEY TRANSFER SYSTEM, issuing Jul. 28, 2015, as U.S. Pat. No. 9,092,763, each of which is incorporated by reference herein, in the entirety and for all purposes.

FIELD

The present disclosure relates generally to apparatus and methods for transferring money, and more specifically to apparatus and methods for the retail purchase of a money transfer transaction that performs a purchaser-selected purpose using purchaser-controlled delivery features to effect a money transfer.

BACKGROUND

Money transfer and similar arrangements are used by many consumers in lieu of bank accounts to send money, make payments, and conduct similar transactions. Rather than money being held in a traditional banking account, a customer provides cash to a money transfer company, such as a non-bank financial institution (NBFI) providing money transfers, where it may be transferred (immediately after payment or later in time) to another person. The money paid to the money transfer company is not held in a federally insured or regulated account of the customer, but rather is merely held by the transfer company under a documented financial obligation to pay the money to a person designated by the customer. Often, the money transfer company has very effective systems for providing cross-border money transfers.

Present money transfer procedures typically involve a customer going to a money transfer location, such as an agent office of the money transfer company, and giving the customer service representative (CSR) a variety of personal and recipient information. Alternatively, a transaction may be staged by contacting a CSR by telephone to provide personal and recipient information, with a visit to an agent office for fulfilling the staged transaction with a payment. The personal and recipient information a sender provides may include the names and addresses of the sender (customer) and recipient, proof of sender identification, and the amount to be transferred. This information is entered into a money transfer system, and, after the money to be transferred has been collected from the sender, is used to create a send transaction record for the money transfer. The send transaction is now ready for the receive phase, so the sender notifies the recipient of the transfer. The recipient usually then goes to a separate money transfer agent location, such as another location of the money transfer company or agent thereof, to pick up the money transferred. The recipient may be required to provide a money transfer number and/or proof of identification at the receive location, prior to picking up the money.

Present money transfer systems, however, are typically not thought of by the customer as anything more than a financial vehicle for transferring money. That is, when a customer uses a money transfer system, he/she typically thinks only of the purpose to transfer money from himself/herself to another individual that needs money or to an individual or business to which the customer owes money. This limited view of money transfer systems may be due in part to the agent office or service counter context at which money transfer systems are presented to and interact with the customer, and the lack of money transfer purchasing capabilities in traditional retail purchase contexts.

SUMMARY

In one embodiment, described herein is a system for performing money transfer send transactions comprising: a computer system connectable to receive data representing a send transaction identifier of at least one token and for presenting to the sender a completion interface, said interface including fields for receiving send transaction information and message options related to the specific money transfer purpose; and a memory for storing in response to receipt of sufficient information entered at the completion interface, an active, funded send transaction record in the computer system including the message options.

In another embodiment, described herein is method of performing money transfer send transactions comprising: receiving at a computer system data representing a send transaction identifier of such token; presenting to a sender a completion interface, said interface including fields for receiving send transaction information comprising: sender identification information; recipient identification information; and sender option selections for delivery features in a money transfer receive transaction; and responsive to receipt of sufficient information entered at the completion interface, storing an active, funded send transaction record in the computer system identifying the option selections of the sender.

BRIEF DESCRIPTION OF THE DRAWINGS

FIG. 9 depicts in schematic form the information fields in a send transaction record as used in the present invention.

DETAILED DESCRIPTION

Figure 1A:
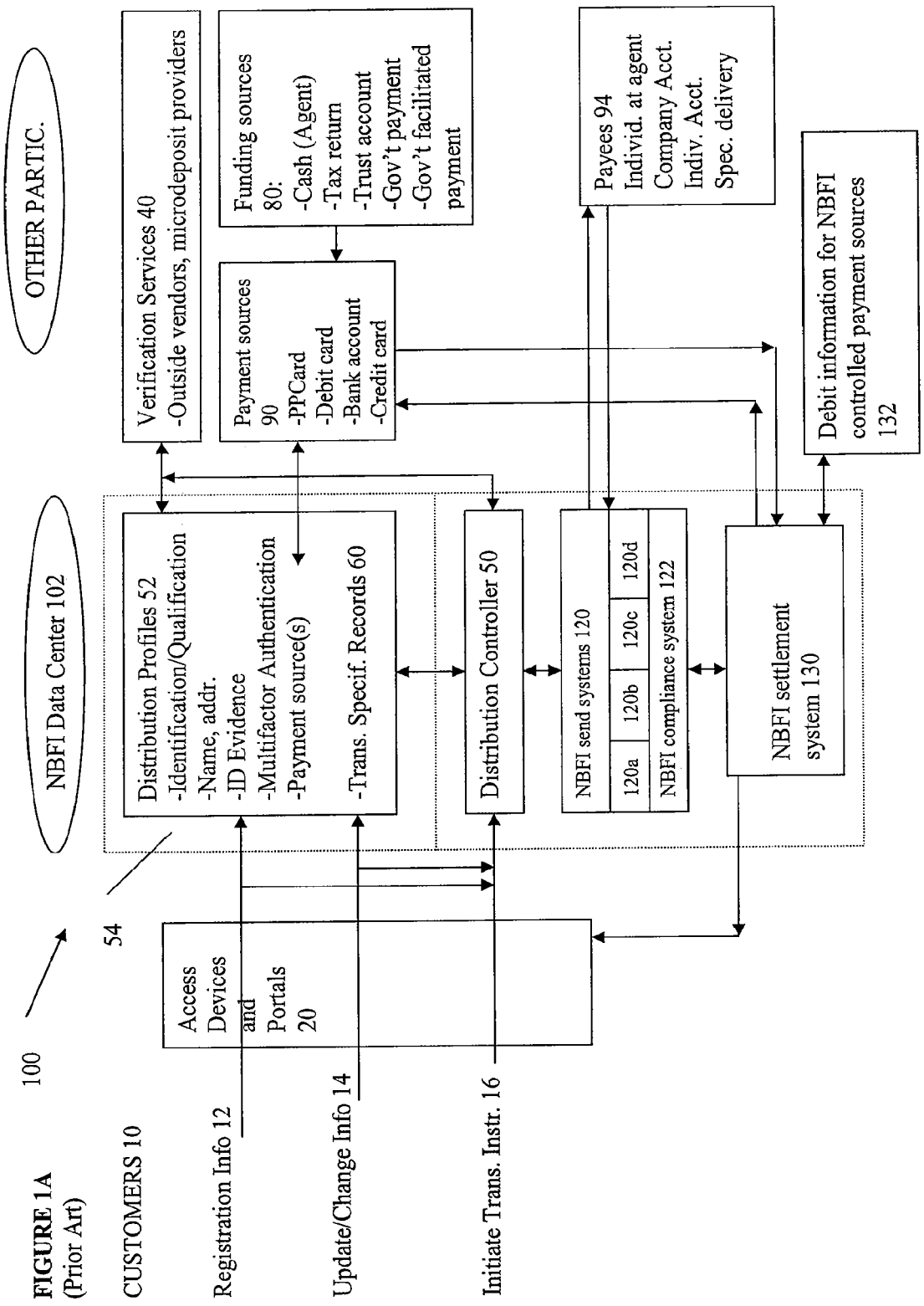
FIG. 1A is a schematic block diagram of a prior art system for money transfers by an NBFI for customers.

Advantages of the System and Method:

The present disclosure relates generally to apparatus and methods for transferring money, and more specifically to apparatus and methods for the retail purchase of money transfer transactions, in particular with use of tokens representing a specific money transfer for a specific sender purpose. In particular, disclosed herein is a system and method to make a money transfer transaction an attractive retail purchase, for example, by packaging the money transfer product as a consumer merchandise item within a retail environment and presented to the consumer in a familiar retail purchase context.

The retail money transfer transaction as described herein is made consistent with the conventional money transfer records and record-keeping of the NBFI data systems. A worldwide, high-speed money transfer system uses and relies on send transaction records for each of the money transfer transactions, with each record having its own transaction identifier. In the present system, this record is linked to a retail purchase transaction at a point of sale, whereby the transaction is funded. This funding is documented by updating the record associated with the money transfer transaction identifier and associated retail token. Alternatively, the funding is documented by creating a new money transfer record with a new money transfer transaction identified with the associated retail token. Either way, a funded money transfer transaction is reflected in NBFI computer records and has a particular transaction identifier that permits its tracking from origination of the money transfer transaction to its payout. While one transaction identifier may apply to the transaction throughout, it will be clear that with appropriate linking or substitution of identifiers, multiple identifiers may be used for one transaction. Accordingly, the present system and method focus on the creation and modification of a money transfer transaction record, funded in a retail purchase and customized by the sender to define a desired receive transaction. From a time of origination when the initial record lacks key data, the system 100 collects the necessary data and transforms the initial records into a send transaction record ready for a receive transaction customized by the sender.

The presently disclosed system and method thus may extend money transfer sales beyond the typical service desk at an agent of the money transfer company into retail locations to, among other things, expand the sales of money transfer products. For example, the money transfer products described herein may be designed for and marketed to a consumer based on different consumer needs or motivations and based on different consumer reasons for purchasing the money transfer. For example, a special purpose of the money transfer may be a gift for a special personal or family event or on the occasion of a secular, religious, or ethnic holiday, among others. The money transfer products may be designed so as to include a token and packaging that shows the customer that they are not just purchasing a money transfer, but rather a gift for a specific purpose or occasion.

The presently disclosed systems and methods allow the purchase of money transfers to be initiated or conducted at a retail POS, such as in a retail store, at a specially designed kiosk, or on-line at a website of the money transfer company. Money transfer product tokens provided in a retail store (or at kiosks for the purchase of money transfer products) may be displayed in high-traffic and high visibility locations within a retail store such as, for example, in an aisle where other products appear or a freestanding fixture near other products. Furthermore, money transfer product packages may be placed where complementary products are displayed and sold within the retail store, for example, greeting cards, gift registry, prepaid phone cards, gift cards, etc.

While the retail purchase context can present money transfers in a way that encourages their retail purchase, the rapid purchase process is not suitable for collecting all information for a send transaction. Accordingly, the presently disclosed system and method provides completion interfaces where the money transfer transaction details may be collected for an NBFI's send transaction records. These interfaces both carry on the retail purpose theme (e.g., a gift for event) selected by the sender at purchase and let the sender control certain aspects of the receive phase to reflect the retail purpose theme. While the description below will refer primarily to an NBFI providing the tokens, computer system, agent network and other infrastructure for the present invention, the system and method may be used by any organization permitted to perform money transfers.

Overview of the System and Method:

In one embodiment, a customer selects a money transfer package, or token, from an in-store display. Each money transfer token may have a category SKU identifying the money transfer features or the specific money transfer purpose, and/or a unique money transfer identifier to identify a specific money transfer package or transaction. For example, the token may represent a birthday transfer to a sibling in Mexico of pesos corresponding to US$50. A cashier at a purchase terminal at the point of sale (POS) may scan an SKU or similar barcode of the money transfer package or token upon presentation by the customer, and the cashier may then collect money from the customer for the money transfer package and any other products the customer has selected at the retail POS. The purchase is rapid, as neither the customer nor the cashier has to provide or record at the POS the details that are a necessary part of a money transfer transaction before it becomes available to a recipient. The purchase price of the money transfer product may include the face value of the money transfer product plus a send fee. Upon retail purchase, a money transfer transaction record may be created within an NBFI data processing system, specifically in a transaction database, of the NBFI. A unique transfer transaction identifier may thereby be created. Alternatively, the system finds and updates a pre-existing (incomplete) money transfer transaction record created with a transaction identifier before the retail purchase. The daily purchases of money transfer products at a particular retail store may be aggregated and reported to and/or settled by the NBFI at the end of each day, or at any other time interval. The settling process may be accompanied by a review using an interface to allow the retailer to confirm that such retail-purchased money transfers are a paid transaction, thereby reducing fraud.

After purchasing the money transfer product at the retail POS, the customer may then interact with a completion interface, which may include, for example, an online website, an in-store kiosk, a call center or a telephone interactive voice response (IVR) system. The customer provides the completion interface with a unique money transfer identifier (e.g., an identification number) linked to the money transfer transaction purchased at the retail store and, upon being presented interface screens or other prompts (e.g., an IVR script) tailored to the specific kind of transaction purchased (e.g., birthday transfer to a sibling in Mexico of pesos corresponding to US$50), provides the details needed to complete the money transfer. These may include, for example: the customer/sender name, address and telephone number; the receiver name, address and telephone number; the money transfer destination and delivery mode (if not already determined by the token and product type), any other required information and optional information specifying delivery features for the receive transaction. These delivery features may reflect the specific kind of money transfer product purchased and the sender's customization of the delivery to the recipient. The money transfer transaction record is filled out in this interaction with the interface and, as the record is completed, its data may be processed through and stored in existing data processing systems of the NBFI. For example, the money transfer transaction record data may be subjected to standard compliance and other operational processes of the NBFI, such as, for example, fraud prevention and required regulatory recordkeeping.

After completion of the money transfer transaction record by interaction at the completion interface, the transferred money becomes available for the recipient to pick up at any worldwide receive location of the NBFI within a short period of time, for example, 10 minutes or a few hours. Alternatively, the money may be transferred to a specified financial account of the recipient. When the transferred money is received by the recipient or recipient account, the customer/sender may be notified by, for example, e-mail, text message, or letter.

As will be appreciated, presently disclosed systems and methods offer greater control and choice for money transfer consumers. Furthermore, customers who may never have previously purchased a money transfer product may be prompted to do so by the retail purchase nature of the money transfer products disclosed herein. For example, such money transfer products may be defined to embody the purpose for which the customer is sending money, i.e., a special occasion, which may include, for example, a personal or family event or holiday. Presently disclosed systems and methods also offer benefits to the NBFI and its agents. Money transfer products may be purchased with greater speed and convenience at a retail store or other convenient location, as the details of the money transfer may be completed at a post-purchase time and a different location from the point of purchase of the money transfer product package. Presently disclosed systems and methods also give the customers greater control over their personal information and that of the recipient, as the customer may provide this information directly to the money transfer company in the privacy of a home or office, rather to an agent of the money transfer company at a public location, for example, the agent's counter or other office environment.

Furthermore, the presently disclosed data processing and communications systems and methods allow a money transfer product to be portable; that is, a customer may purchase the money transfer product at a particular time and make the money transfer at a later time. The purchase of a money transfer product is removed from the traditional setting of the service desk or other agent location of the NBFI and moved to a retail setting, where the money transfer product and package may be tailored to consumer needs and desires and become more visible to more potential customers. A money transfer product designed for and presented in a retail context may thereby be thought of by the customer less with respect to the bare transfer of money, but rather as connected to the occasion or purpose for which the money is being transferred, for example, a gift for a particular occasion or event.

Money Transfer System:

As previously mentioned, the systems and methods of the present disclosure may be adapted to work with existing money transfer systems of a money transfer company. One exemplary system is described in U.S. patent application Ser. No. 11/608,040 (pre-grant publication number 2008/0140568) filed Dec. 7, 2006, the contents of which are herein incorporated by reference in their entirety.

With particular reference to FIG. 1A (from publication number 2008/0140568), therein is depicted a schematic block diagram of a system 100 for performing money transfer transactions and its surrounding environment. The main participants in the system are the customers 10 and an NBFI that already has effective money transfer systems in operation at its data center 102 and wishes to extend their utility and attract additional customers. Part of the NBFI's system 100 is one or more customer access portals 20 that provide access to one or more variants of the NBFI's services. These may include one or more customer service centers with customer services representatives (CSRs) to handle telephone calls from customers and to access relevant data at the NBFI's data center 102. (The customer service center may be a single geographical location or a number of locations networked together to provide sufficient CSRs, with appropriate language capability, to effectively handle the contacts initiated by customers.) Also used to access the NBFI's system are NBFI "agents", who are businesses independent of the NBFI that work under contract with the NBFI and have agent terminals with communication links to the NBFI data center. Agents serve as customer contact points for send transactions and also act as contacts points for money transfer recipients. Other devices or portals for accessing the existing NBFI data center 102 systems may include websites accessible by personal computers, mobile computers, mobile phones and PDAs or interactive voice response systems, all communicating with the NBFI's CSRs and/or data center 102. In the system 100 the access portals 20 communicate with a database 54 and a distribution controller 50 running at the data center 102, which interacts with customers 10 and their profiles 52 and send transaction records 60 for a range of money transfer transactions.

Verification services 40 may be used to help ensure the accuracy of information from customers 10. For example, for confirming accuracy of a name, address, telephone number, or other information an individual may provide, a verification service that has aggregated and correlated large amounts of publicly available information may be consulted. Another form of verification service is one that checks the status of bank accounts or that performs a micro-deposit in an account (e.g., a few cents) and determines if a party claiming that account can accurately report the amount of the deposit, thereby showing accountholder status. A further form of verification may involve OFAC or other listings prepared by governments.

Payment sources 90 represent one or more accounts accessible by the NBFI for funds for send transactions. Alternatively, there may also be third party payment (as opposed to funding) sources 80, such as bank accounts and credit or debit card accounts with companies that have contractual or network relations with the NBFI. A further class of system participants is payees 94, recipients of a send transaction, which may be individuals or businesses. These recipients may receive a money transfer in any of the several ways offered by an NBFI and its agents, e.g., cash or money order at an agent, company or personal bank account deposit, home or office delivery, etc.

In the system as shown in FIG. 1A, customers 10 who wish to take advantage of the system set up send transactions in a portion of a database 54 and then provide instructions to perform the transactions enabled by the send transaction records 60. The first step in making send transactions is for the customer to provide sender registration information 12. This is basic personal identification information, e.g., name and address, telephone number and also qualification information, which is a specified form of identification sufficient under applicable regulatory rules to permit the individual to make use of at least the basic level of money transfers, and possibly also higher levels. In addition, registration may require multifactor authentication information and identification of at least one payment source 90 for funding transactions.

Under the system of publication number 2008/0140568, during registration or thereafter, the customer 10 selects from among the available send transaction options and parameters and specifies for inclusion in the send transaction records 60 one or more transactions that the customer wants to initiate, preferably transactions that the customer expects to initiate more than once. These are defined in transaction specification records (TSRs) 60 that specify the recipient, the selected send options and other parameters relevant to defining one or more money transfer transactions supported in the NBFI send system 120. The transactions may be selected from among those offered by the NBFI through one or more of multiple transaction processing platforms 120a, 120b, 120c, 120d that the NBFI has developed for conventional one-off cash transactions or other existing transactions types initiated from particular agent groups, or for particular transaction types or technology platforms.

Figure 1B:
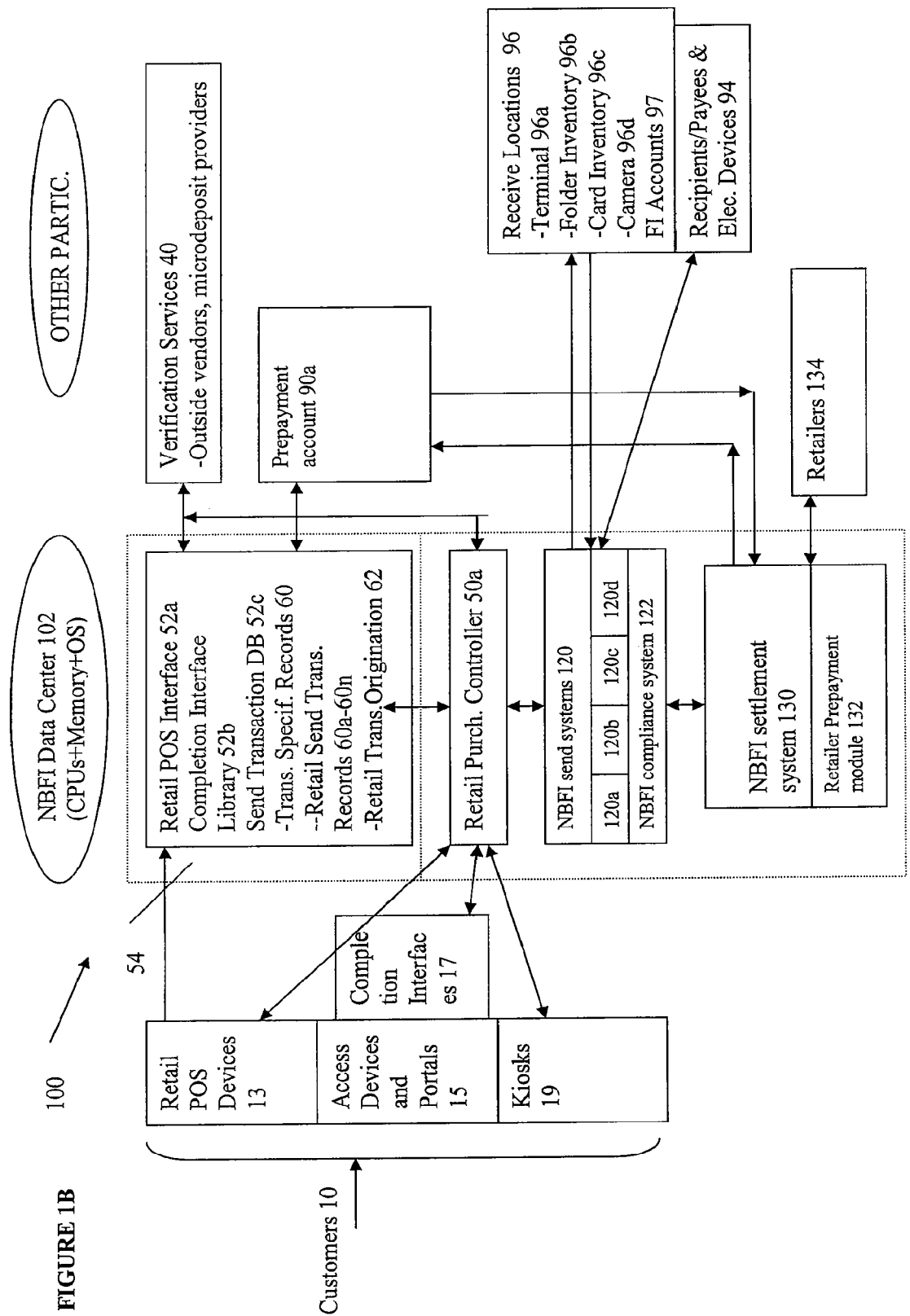
FIG. 1B is a schematic block diagram of the present system for retail sale and sending of money transfers by an NBFI for customers.

FIG. 1B is an adaptation of FIG. 1A, to show elements of the present system and method. The customers interact with the NBFI Data Center 102, via retail POS devices 13, access devices and portals 15 that communicate with completion interfaces 17 and kiosks 19, all of which communicate with a retail purchase controller 50a. The retail purchase controller 50a communicates with database 54. Among the data and executable software components stored in database 54 are Retail POS Interface 52a, a Completion Interface Library 52b and a Send Transaction database 52c, that contains Transaction Specific Records 60 (including Retail Send Transaction Records 60a-60n), in various complete and incomplete forms and various states. For the present system and method, the retail purchase controller 50a is a central component of the data system 100, consisting of hardware for executing various executable modules and the software modules that execute to perform the various data communications and transformations of money transfer send transaction records, as these are created, funded, activated and deactivated as money flows through the system 100 from customers to recipients. The present system and method also includes a prepayment account 90a for storing the funds of the funded send transactions. FIG. 1B also shows the payees/money transfer recipients 94 who engage in the receive transactions at a plurality of receive locations 96 in communication with the NBFI send systems 120.

The system 100 of FIG. 1B uses certain core components of the NBFI data processing systems 102 (which has processors, memory and operating systems), including the existing send systems 120 (e.g., legacy platforms 120a-120d) and its compliance system 122, which addresses the regulatory aspects that vary by transaction amount and jurisdictions governing sender, recipient, any agent involved and/or the NBFI. Thus, the retail send transaction records 60a-60n are assembled so that the transaction specified will normally satisfy the requirements of the NBFI compliance system 122 that will be applied when a send transaction record 60a is transformed into a funded, active send transaction. For clearer explanation, the retail send transaction records 60a-60n are shown separate from the other send transaction records; however, they may be implemented to be in the same database as one or more other collections of money transfer transaction records or in a different one. Further, the system 100 may make use of the existing NBFI settlement system 130 to send and receive payments due to or owed from agents, billers, prepayment account 90a and other system participants. The retail purchase controller 50a serves as the coordinator for exchanging information with customers 10 and preparing the send transactions it processes by making use of the existing components of the NBFI data center 102 and working with the send transaction records 60a-60n.

The present retail transaction system makes use of the NBFI data center 102 by using a retail purchase and a purchaser interaction at a completion interface to develop a completed send transaction record within the system of FIG. 1B. The present system goes beyond prior systems by allowing a customer to specify in the system and thereby instruct a relevant agent and/or agent terminal to provide in association with the receive transactions, certain features unique to the product type of the money transfer send transaction the purchaser sets up at the completion interface.

FIG. 9 depicts in schematic form the information fields in one embodiment of a send transaction record as used in the present invention. Although fields are shown in FIG. 9 as containing data, it will be recognized that the fields may also contain pointers to other fields that actually contain the data. A typical transaction record may contain the following fields: Transaction Identifier 902, Product Type 904, Sender Information 906, Recipient Information 908, Active/Inactive status 910, Funded/Unfunded status 912, and Delivery Features 914. The fields may have the content and/or data types shown in FIG. 9. While the fields are largely self-explanatory, a few merit further definition: Product Type 904—has to do with the particular money transaction or the specific money transfer purpose that is represented by the record, e.g., a $50 domestic graduation gift transfer; a transfer from a U.S. sender to a Honduran recipient with a U.S. currency value of $100, to be delivered to a bank account; Active/Inactive status 910—specifies whether a funded transactions is ready for a receive transaction, is not yet ready or has already been paid out; Funded/Unfunded status 912—specifies whether money has been paid in for the particular send transaction; and Delivery Features 914—specifies a variety of actions that may be sender-selected to occur as part of a receive transaction, including actions that express the sender's purpose for the send (which may include various text and images provided by a sender, as well as menu selections). Other fields 916 may be added to carry other information that may be relevant to a retail money transfer or congruent with other send transaction records (date/time stamp, internal audit data, regulatory data) or each record may contain a pointer to an entry in another database that contains related data, such as retail purchase details. This leaves the record shown in FIG. 9 compact and focused on the financial and delivery feature details of the retail money transfer transactions.

Token for Purchase at POS:

The money transfer retail product may be embodied in the form of a physical token that represents the particular money transfer to be purchased. The customer may purchase the token at a convenient location, such as a retail or merchant location. In one example, tokens representing a variety of common transactions, selected based on consumer research, may be displayed for sale near the checkout lane of a retail grocery store, convenience store, gas station, department store, etc. A person making grocery or other purchases may conveniently select a token and provide it along with other purchases/grocery items to the clerk for purchase at checkout. It is intended that tokens may be offered for sale at any convenient retail location that a customer may visit to make purchases, so that the customer does not have to locate and make a separate trip to a dedicated money transfer office/station or counter, or otherwise follow the traditional process used for paying in money for transfer. Furthermore, no personal information needs to be provided to the retail clerk to purchase the token, and the price of the token may be simply added to the total price of all items being purchased at the store.

It should be appreciated that the term "token" is used herein in a broad sense, and may be implemented in many different forms. For example, it may include (but is not limited to) a card-like structure, a package, a smart card, a ticket, or any other tangible item that may be presented to and selected by a customer and that bears product information (to be described below) that can be used to identify the token for purchase at a POS terminal.

Tokens may be differentiated by product type. Among the dimensions that determine different product types are: different sender purposes (e.g., birthday, anniversary, congratulations on new baby); send amount; currency or recipient jurisdiction; delivery mode (e.g., agent, account, home, etc.); and delivery features (e.g., gift envelope, gift card, e-mailed card, printed custom card). Thus, each token, when purchased, represents a certain fixed set of features that are its retail product core identity, but it is also associated with a completion interface matched to the product type that allows the sender not only to provide necessary transaction details but to select from available delivery features that tailor the receive transaction to the sender's preferences.

Figure 8A:
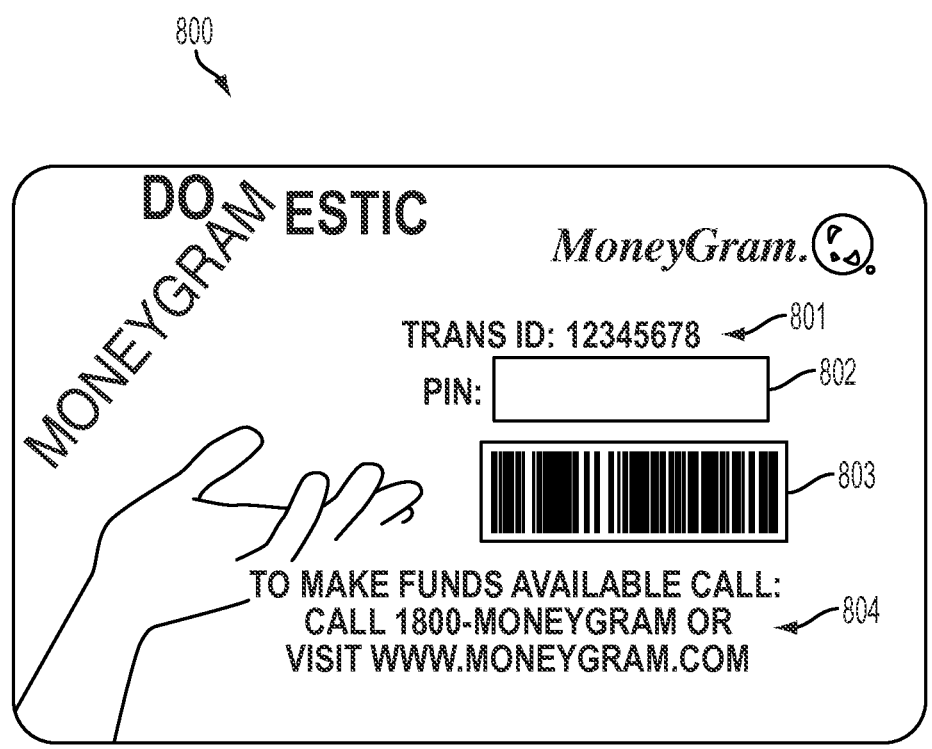
FIG. 8A depicts one embodiment of a token as used in the present system for retail sale and sending of money transfers by an NBFI for customers.

In one embodiment, a token may have a displayed face value or denomination, e.g. $25, so that a customer knows the transfer amount when the instrument is selected. A service or money transfer fee may also be displayed on the token, which may be added to the face value for the total purchase price. (However, in some embodiments, the token need not have a face value, but rather may be specified to have a monetary amount selected by the customer at the time of purchase and communicated to NBFI system 100 for the corresponding send transaction record.) The money transfer product package or token package may carry transaction identification (ID) information or product data, e.g., in the form of a UPC or SKU code, that can be scanned and read at the POS terminal. As depicted in FIG. 8A, a token 800 in the form of a card may include a printed transaction ID 801, a personal identification number (PIN) 802 (which may be revealed by "scratch-off" by the consumer after purchase, so as to prevent fraud), and an SKU barcode 803. Other forms of transaction ID may be employed, as well as other printed numbers and other data useful for retail purchase analysis, which may be manually entered by the clerk at the POS terminal, or the token may have product or transaction ID data electronically stored on a magnetic stripe or smart card chip that may be read at the POS terminal. The instrument may also incorporate an RFID (Radio Frequency Identity Device) that electronically transmits transaction data. (As can be understood, any data to be stored on a token can be printed, stored in an optically coded mode or in an electronically coded mode, so long as a machine or a human can "read" the data for use in retail sale reportable to the MBFI data processing system.) The transaction identifier for each token alternatively may be created in and delivered from the NBFI system 102 by a POS interaction of the retail POS devices 13 with the NBFI system 102 over a communication network of any kind, and provided to the customer printed on a receipt along with any other items being purchased at the store, for later use in completing and activating the money transfer. To guide the purchaser, completion interface contacts 804 may be printed on the face of the token, or may be provided to the customer via a receipt provided by the cashier.

Figure 8B:
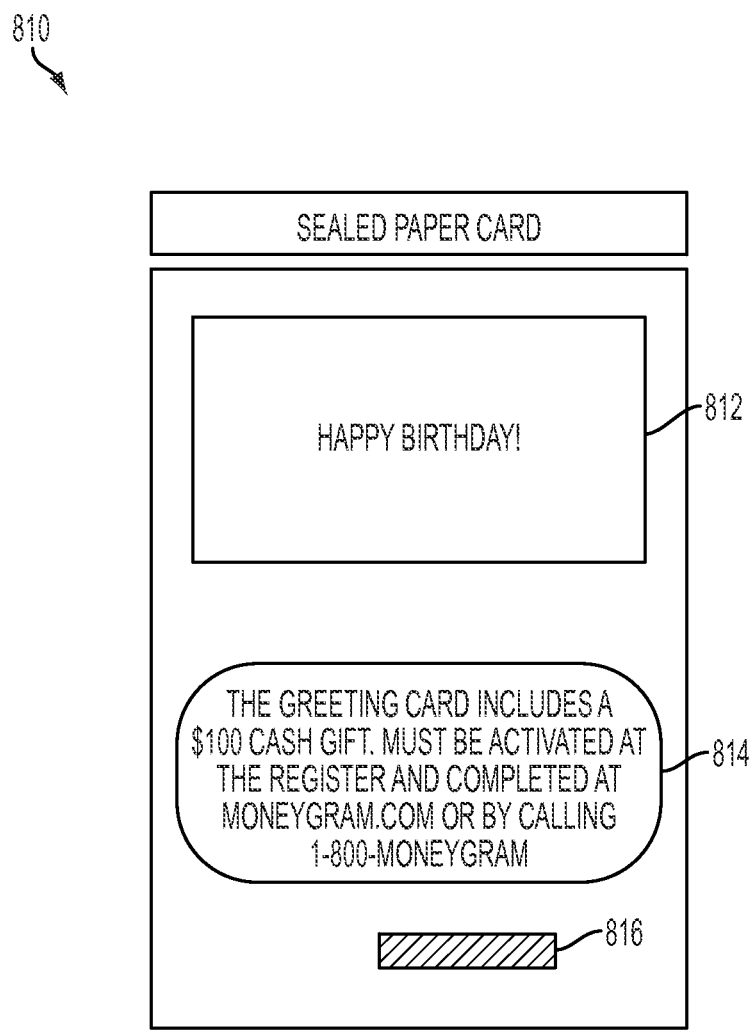
FIG. 8B depicts an alternative, greeting card embodiment of a token as used in the present system for retail sale and sending of money transfers by an NBFI for customers.

Alternatively, as depicted in FIG. 8B, a token 810 in the form of a greeting card may include a greeting 812 representing the occasion for which the money transfer is purchased, for example, in the case of a birthday, a "happy birthday" greeting 812 may be displayed on the face of the card. Completion interface contacts 814 may be printed on the face of the card, or may be provided to the customer via a receipt provided by the cashier. Furthermore, reference numbers, which may include a transaction identification number and/or a PIN number may be included within the card, or on the face of the card as depicted at reference number 816. Additional information may be provided in or on the greeting card 810 in accordance with the present disclosure, furthermore, sealing, masking or other additional security features may be included for or on the greeting card 810 as discussed above with respect to the card 800 in FIG. 8A.

Figure 8C:
FIG. 8C depicts examples of several tokens for different product types as used in the present system for retail sale and sending of money transfers.
Figure 8C:
Figure 8C:
Figure 8C:
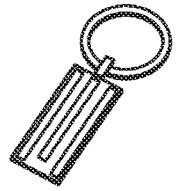
Figure 8C:
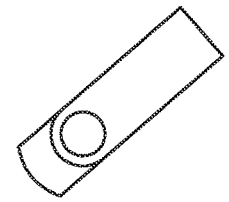

As will be appreciated, tokens, the visual attributes present thereon, and the packaging in which they are contained may take a form, shape, or configuration, and may display a design selected as appropriate for a particular sender purpose or occasion for which a retail-purchased money transfer may be desirable. As depicted in FIG. 8C, various flat token designs are shown at reference numeral 821, including printed or printable designs which may be appropriate for a birthday, Christmas, Hanukkah, Easter, college, or Mother's Day, for example. Further, various flat and three-dimensional token forms and configurations are shown at reference numeral 822, including cards, greeting cards, key chains, and clips.

In general, the format and design of a token for purchase by the customer may represent or embody any desirable presentation to communicate to the customers that they are not merely purchasing a money transfer, but rather a gift embodied by the token. The presentation design of the token may be specific to the location, event, or gift for which the customer is buying the token, for example, a birthday, anniversary, wedding, etc. The token may take any form consistent with its data carrier functions and purpose-communicating functions referenced above.

Figure 3:
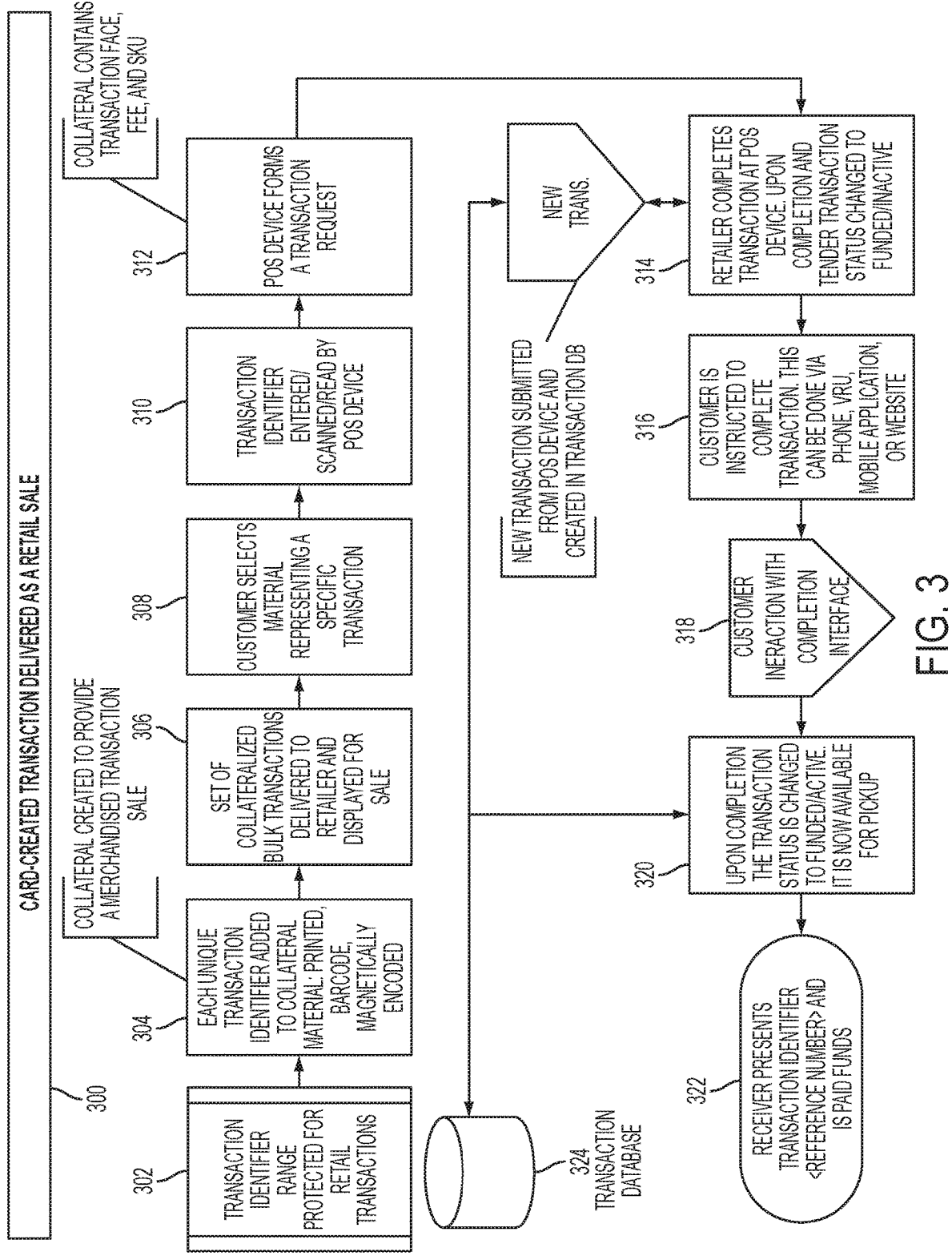
FIG. 3 depicts the logical flow of a card-created money transfer transaction delivered as a retail sale.

Send Transaction Record Origination:

A money transfer purchase transaction for retail purchase in accordance with the present disclosure may be recorded in the NBFI data system 100 as either a card-created transaction or a pre-defined transaction. A retail transaction origination software module 62 stored in system 100 contains the software code executed to perform the steps required for these two modes of transaction origination. In embodiments wherein a card-created transaction 300 is recorded, as depicted in FIG. 3 at step 302, a range of transaction identifier numbers may be designated in the system 100 and protected for use with retail money transfer transactions at retail locations. At step 304, each unique transaction identifier number may be added to a particular token, for example, printed on the token, bar code encoded, and/or magnetically or otherwise encoded. As previously discussed, the token is created so as to provide a merchandise transaction sale, such that the customer perceives the purchase is being made for a particular selected purpose, rather than just a transfer of money. At step 306, a set of bulk transactions embodied in tokens may be delivered to or otherwise provided to a retailer and displayed for sale at retail location. The status of each transaction in the NBFI data system 100 (i.e., the status of each money transfer send transaction record) is initially designated by transaction origination module 62 as unfunded and inactive, with no corresponding "live" send transaction record stored in the NBFI data system, prior to purchase of the associated token by a customer. (A truncated listing or some other abbreviated record of transactions might exist, outside the send transaction record database. However, records in the send transaction database 60a-60n upon completion represent transferable money value and thus are created and modified with a high degree of system security.)

While shopping at a retail location, at step 308, the consumer may select a token for purchase. At step 310, the consumer may present the token to a cashier at the retail location, where the transaction identifier number may be entered, scanned, or otherwise read by a point-of-sale device. At step 312, the point-of-sale device forms a transaction request data item which, in some embodiments, may include the face value of the token, the fee associated with the purchase of the token, and SKU. Then, at procedure 314, after receiving payment, the cashier at the retail location sends the transaction from the point-of-sale device to the transaction database 324. The status of the transaction record associated with the token may then be changed from unfunded and inactive to funded and inactive.

At step 316, the customer who purchased the token may be instructed to complete the transaction record by entering sender, feature, and recipient information at a completion interface, which may include a telephone number to call, or use of a website, a kiosk, or a mobile application. At step 318, the customer is presented and interacts with one of the completion interfaces (stored in completion interface library 52b, see FIG. 1B) selected based on both the product type and the access platform the customer uses, as discussed in more detail below with respect to FIG. 6A-6C. Once the send transaction record has been completed by the customer, the transaction status associated with the money transfer transaction represented by the purchased token is changed from funded and inactive to funded and active, as depicted at step 320. When the send transaction record has this status, the funds become available for a receive transaction with the designated recipient, in a manner which will be discussed in greater detail below. At step 322 (assuming a receive transaction at an NBFI agent), the recipient may present the receive transaction identification number and receive the transferred funds. Alternatively, the funds may be sent directly to the recipient's bank account or other account.

Figure 4:
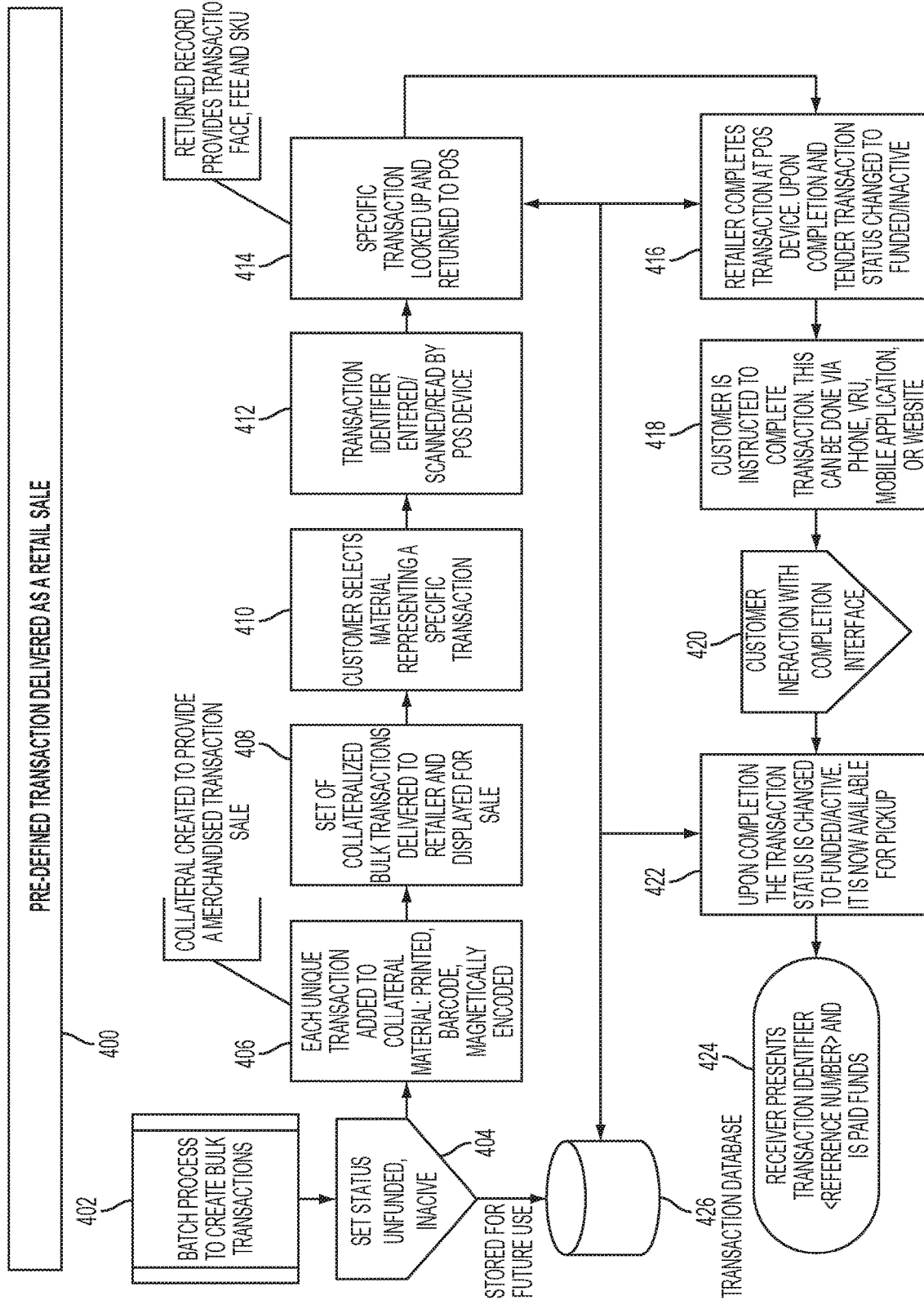
FIG. 4 depicts the logical flow of a pre-defined money transfer transaction delivered as a retail sale.

Referring now to FIG. 4, alternatively, in embodiments where a predefined money transfer transaction 400 is recorded, a batch process (coded in the transaction origination module 62) at step 402 is used to create bulk money transfer transactions. These transactions are embodied in stored electronic records that may contain similar information to a card created transaction, including, for example, unique transaction identifier numbers, SKU data, and transaction status, which is initially set at unfunded and inactive (step 404). At step 406, each unique transaction identifier is added to a token, using printed information, bar code, and/or magnetically or otherwise encoded means. At step 408, a set of these bulk transactions embodied on tokens may be delivered to a retailer and displayed for sale. At step 410, a customer may select a token representing a specific transaction. At purchaser checkout, the transaction identification number may be entered, scanned, or otherwise read by a point-of-sale device, at step 412. The SKU will also typically be read as well, for retail transaction processing like other purchases.

Once the token has been scanned at the point-of-sale device, at step 414, the specific transaction identifier or active send reference identifier (if not on the token) may be looked up (in a communication exchange with the NBFI system 100) and returned to the point-of-sale device for providing to the purchaser/sender. The transaction may then be funded at the point-of-sale, by, for example, the customer paying the purchase price, which may include the face value of the token plus a transaction fee. Thus, at procedure 416, the status of the transaction record may be changed from unfunded and inactive to funded and inactive.

At procedure 418, the customer may be instructed to complete the transaction record at the completion interface, as discussed above with regard to FIG. 3. At step 420, the customer is presented and interacts with one of the completion interfaces (stored in completion interface library 52b, see FIG. 1B), selected based on both the product type and the access platform the customer uses, as discussed in more detail below with respect to FIG. 6A-6C. Upon completion of the completion interface, at procedure 422, the transaction record status may be changed from funded and inactive to funded and active. The transferred money may then be available for a receive transaction with the recipient. The receive transaction may occur by pick up at a receive location of an agent of the money transfer company, when the recipient presents the transaction identifier at step 424. Alternatively, the money may be sent to the recipient's bank account or other account.

With regard to either of the procedures described in FIG. 3 or 4, a database 324, 426, respectively, may be provided to receive/provide the relevant transaction data at each procedure. The transaction databases 324, 426 may be in operative communications with the system 100 as described in FIG. 1B (and may be embodied in database 54), and thereby connected to the money transfer system 100 of the money transfer company (NBFI), while at the same time being in operative communication with the systems of the various retail stores/outlets where money transfer products (tokens) may be purchased.

Completion Interfaces:

Because the retail POS purchase context is not conducive to collecting transaction details, a completion interface may be provided for the customer to provide the details of the money transfer represented by the retail-purchased token, including information related to the recipient of the money transfer. That is, at the time of token purchase, (in most embodiments) the send transaction record lacks important data that must be completed to make a send transaction ready to be activated. The incomplete, place-holder send transaction record associated with a token before purchase is therefore transformed into a funded (but inactive) send transaction record as part of the POS transaction, but this funded send transaction record is further transformed into an active and funded send transaction record by use of a completion interface.

Such completion interfaces may be accessed by various access platforms or portals 15 (see FIG. 1B), for example, a telephone (e.g., from the convenience of the customer's home) to call a money transfer company customer service center, or a PC, PDA, smart phone or other electronic device with a screen display and a keyboard. The customer must provide authentication to access a completion interface for the send transaction record associated with a token purchased, by supplying an access controller 278 communicating with customer completion interfaces 280 (FIG. 5) the transaction identifier and any PIN from the token. After authentication, a suitable completion interface is supplied to interact with the customer. In a telephone access example, the customer interacts with a CSR-based completion interface to provide the necessary personal and recipient information to a customer service representative at a CSR terminal (e.g., name and address of customer, and if a money transfer to an individual is the desired transaction, then also the name of recipient, pick-up location, and so forth). Among other possibilities, the completion interface interaction could also be handled by an automated Interactive Voice Response (IVR) system, using the key pad of a phone and/or voice responses in order to provide the transaction identifier and any PIN, and, after proper authentication, any required personal and recipient information. In other embodiments, the customer (sender) can use a personal computer, PDA, wireless phone, WAP (Wireless Application Protocol) enabled phone or other terminal to access a completion interface and enter required information at an internet website operated by the NBFI. In yet other embodiments, personal and recipient information could be entered at a self-service terminal (e.g., ATM or kiosk) at a publicly accessible location. Of course, the personal and recipient information could also be presented in person at a money transfer office.

To provide security against fraudulent access to a purchased transaction, the access controller 278 for the completion interface may allow access only when the customer enters a transaction identifier or a PIN that is not visible on the token when purchased. This identifier or PIN may be hidden under a removable layer (see FIG. 8A), hidden by packaging or otherwise concealed to all but the token purchaser. In one embodiment, the send transaction identifier is machine readable and not visible until token packaging is removed. Thus, absent carelessness by the token purchaser, only such purchaser will be able to get past the access controller to the completion interface associated with a particular transaction record that needs completion.

Figure 5:
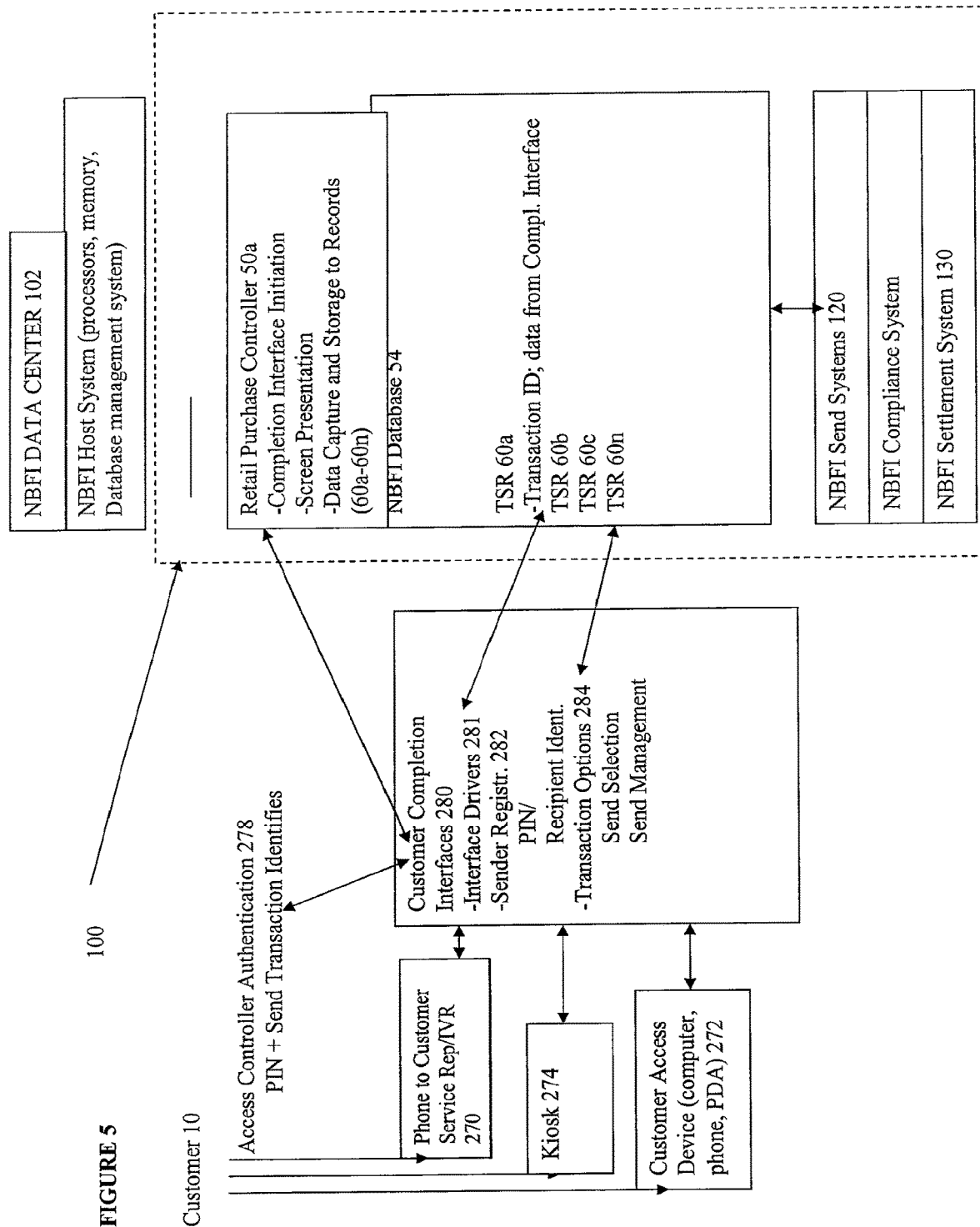
FIG. 5 is a schematic block diagram of the customer completion interface components and operations of the present system for retail sale and sending of money transfers by an NBFI for customers.

Referring now to FIG. 5, and in the context of the money transfer system as discussed above with respect to FIG. 1, the function of a completion interface system suitable for use with the systems and methods of the present disclosure is shown. As shown therein, a customer 10 can use various access portals 270, 272, 274 to the customer completion interfaces 280 to deliver information and customer selections to the data center 102, i.e., to input and receive information relevant to money transfer transaction execution. In each case accessing a completion interface via a portal first requires entry of authentication information at access controller 278, such as a transaction identifier and PIN from or associated with the purchased money transfer transaction token. A first portal for customer use is a telephone for contacting a CSR at a call center (or network) 270. The CSR may be one of several working at the center (or network) and receiving communications from customers 10 using a telephone. The telephones may be spread over the geography served by the NBFI, as long as a communication link to the call center 270 can be established. For example, the customer 10 may reach a CSR from a home telephone or mobile telephone or use a dedicated telephone located at an NBFI agent office. The CSR is typically equipped with a CSR terminal that provides access to a completion interface for completing a send transaction record in the NBFI data center 102. Following authentication, the CSR terminal receives interface screens adapted to the money transfer product type for the transaction corresponding to the transaction identifier provided. The CSR refers to these screens to get the customer's completion information entered into the database 54; that is, the terminal displays interface screens that guide the CSR through the completion process to help ensure that in the customer interchange the CSR collects and properly stores in the identified transaction record in database 54 all necessary completion information.

In addition to communication with a live CSR who provides customer/sender input at a terminal that connects to the NBFI data center 102, the customer 10 using a telephone for access also may be handled by an interactive voice response (IVR) system, in effect, an automated CSR 270. This IVR access portal leads the user through an information collection protocol designed to complete the transaction record. The IVR system can understand the necessary vocabulary or ask for certain information to be keyed in on a telephone or other voice device keypad to complete the transaction record.

A further access portal is a personal computer 272 that connects to an NBFI website via the internet or other communication channel or otherwise electronically communicates with completion interfaces 280 served from the NBFI data center 102. Here, the personal computer (which may be owned by or merely be accessible to the customer 10) can receive completion interface screens stored in the NBFI database 54 and presented by the controller 50a and configured to collect sender and recipient information 282, 284 and other information needed to define the particular money transfer transaction the send desires to perform. These screens capture and return to the NBFI database 54 a customer's responses. Somewhat similar is portal access based on a kiosk 274 operated at retail store, mall, or other shopping center. As with a CSR, the NBFI via data center 102, including controller 50a, or by terminal configuration, can present templates and other interfaces that will guide the kiosk user through the transaction completion interaction.

It is anticipated that, in addition to personal computers, customers 10 may also use PDA's and other personal communication devices 272 with internet or text message services to provide completion information to the NBFI data center 102, based on input screens or other completion interface prompts that guide the customer through the data input and are suited to a smaller format display. Thus, the processes for collecting transaction completion information described herein can be carried out in a variety of ways on a variety of customer access devices. Interface drivers 281 may be employed to adapt the screens or other completion interface-defining data to suit a particular customer access device. Thus, a large screenview suitable for a PC may be partitioned into smaller screenviews based on the specific technical capabilities and limits of the customer access device. The interactions with the completion interface lead to the completion of send transaction records 60a-60n that are stored in the database 54 of the NBFI data center 102 and make the transaction ready for the receive process.

The customer completion interfaces are designed in association with the retail money transfer transaction product types and corresponding tokens. For each product type offered at retail, the system 100 has a completion interface that is adapted to the purchased money transfer. Thus, when a customer uses a portal for a completion interface interaction, and provides the identifier for the purchased money transfer transaction, the system finds the corresponding funded, inactive transaction record. Further, the controller 50a finds the product type data 914 (see FIG. 9) and determines what screens in the completion interface library are to be presented for that purchased transaction. The screens are adapted to product type by completion interface elements reflecting the product type. The elements include one or more presentation elements selected from the group comprising: text, graphics, sound, video and combinations thereof. A completion interface presents to a customer at least one product type attribute selected from the group consisting of: a graphic that embodies a theme of the product type; a graphic that is reflected in a graphic on the token; music that embodies a theme of the product type; video that embodies a theme of the product type; and combinations of the preceding. For example, a birthday money transfer completion interface (set of screens) may have a birthday cake or balloon logo, may play a "Happy Birthday" or culturally equivalent tune, play a short birthday scene video or offer a mix of these. Such presentation elements are selected to evoke the sender's purpose or occasion.

Figure 6A:
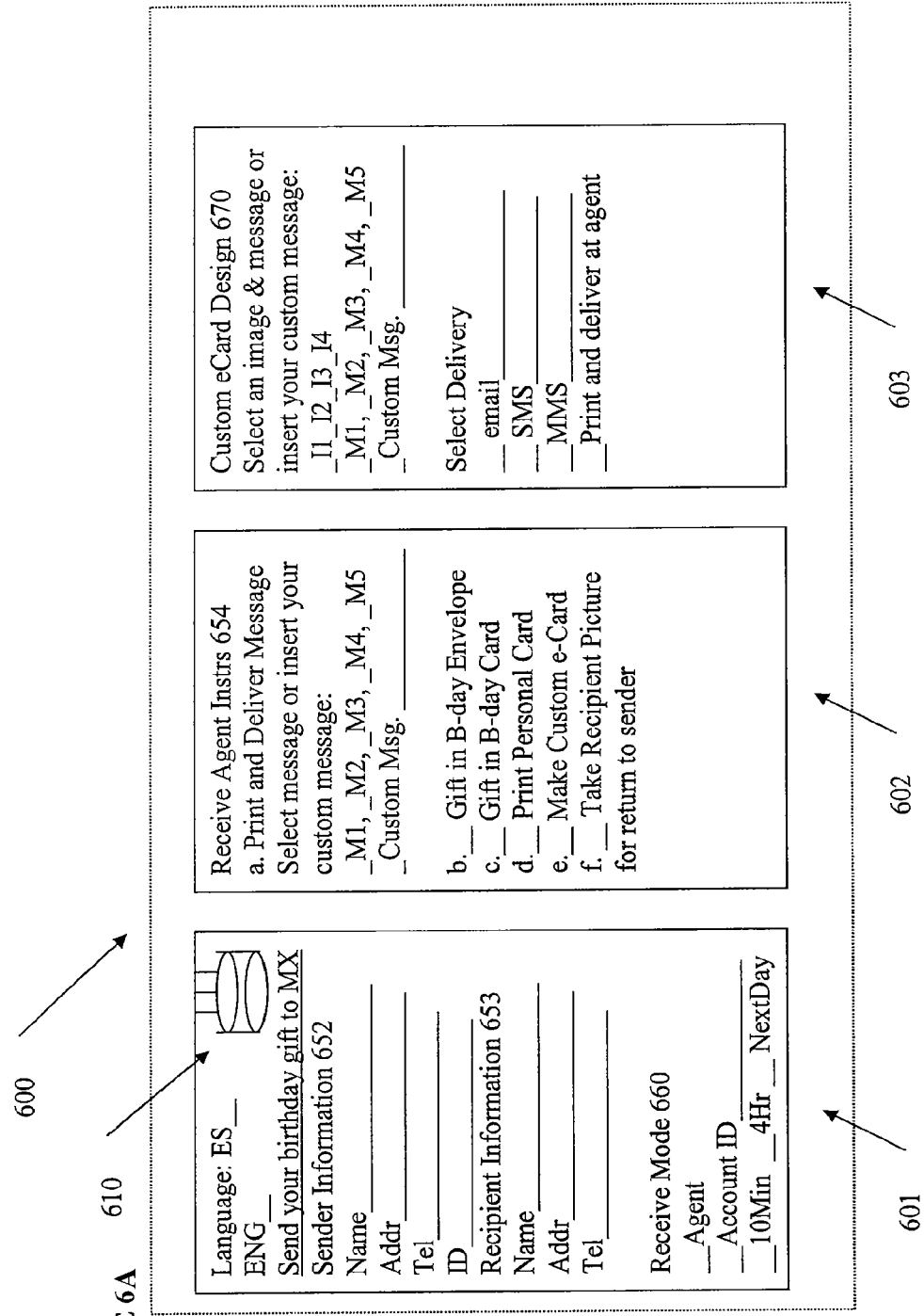
FIG. 6A depicts a simplified example of customer completion interface screens for one product type supported by the present system for retail sale and sending of money transfers.

The customer-interactive data entry portion of a completion interface 280 (as presented at, for example, website, kiosk, etc.) may be configured so as to allow the customer to easily and quickly enter all of the required information necessary to complete the money transfer transaction record, including selecting delivery features for the receive transaction that embody the sender's purpose for the money transfer. With particular reference now to FIG. 6A, an exemplary, simplified embodiment of a completion interface 600 is shown, with interface screens 601, 602, and 603. These screens assume an initial sign-in screen/authentication screen has been presented and the customer has provided at least a transaction identifier from a purchased token. This identifier has led to a transaction record containing product type data (FIG. 5, 904) that is analyzed by the controller 50a to identify the money transfer product type of the token purchased. Based on that product type, an appropriate completion interface is identified from among those stored in database 54 (Completion Interface Library 52b). To further the customer-selected retail purchase, the interface presents to the customer elements that express the sender purpose (e.g., the text and birthday cake illustration 610 shown schematically at the top of screen 601), and presents for selection delivery features (a delivery feature set) that embody the sender's purpose and preferences. The completion interface may also begin with a language selection option for the screens, e.g., ES for Spanish and ENG for English. The remainder of the example assumes English is selected.

At the screen of reference numeral 601, the customer is prompted to input information concerning the sender 652 and the recipient 653. For example, the customer may input name, address, and telephone number with respect to the sender 652 and the recipient 653. Additionally, the customer may be able to select a receive/delivery mode 660, the means and time by which the recipient may receive the money transfer. The option selections may include, for example, by agent of the money transfer company, by account identification number, and receive time availability choices of, for example, 10 minutes, 4 hours, or next day.

At the screen of reference numeral 602, the customer may select from the delivery feature set for the specific product type instructions 654 accessible to an agent of the NBFI at the receive location. Such instructions may include the customer's selection from among one or more stored birthday messages (indicated symbolically at M1-M5; in a real screen the messages would be viewable) or by entering a custom message. Such instructions may further include the customer's selection from further delivery features, such as whether the money transfer will be delivered in a birthday envelope, in a pre-designed birthday card or envelope, a card personalized with an added message or with a sender-selected design, or whether a custom e-Card, delivered by electronic means, e.g. e-mail, will be used (features b-d). If "Make Custom e-Card" is selected, another screen 603 is presented to enable card design. At reference numeral 603, the customer may be able to custom design a card using menu 670, by selecting from among a plurality of stored images or messages, or creating a custom image or message. Furthermore, the customer may be able to specify the means by which the custom card is delivered to the client, for example, by email, SMS message, or MIMS message or by agent printing.

Some selectable delivery features are based on the capabilities or the receive location and its terminal 96a (see also FIG. 1B). These may include an inventory of certain stock payout envelopes and cards 96b, 96c or other tangible deliverables and/or a printer that is part of or connected to an agent terminal 96a at which a custom message stored in the transaction record may be printed on a stock envelope or card or on blank card stock and dispensed. (In some embodiments, the selectable delivery features may include other deliverable options, such as delivery of flowers, sweets or some other relatively common form of gift that a receive location may have reliable access to for inclusion as part of a receive transaction.) In one embodiment, as seen in option f in screen 602, the agent terminal is equipped with a camera 96d and the customer may select as a delivery feature that the agent takes a picture of the recipient for transmission back to the data center 102 and ultimately communication to the sender. Thus, in some embodiments, the agent may be further instructed to take the picture of the recipient in connection with receiving the money transfer (gift) for subsequent viewing by the customer. This allows the customer to see the recipient's reaction upon receiving the gift, as may occur in a traditional person-to-person gift situation.

Figure 6B:
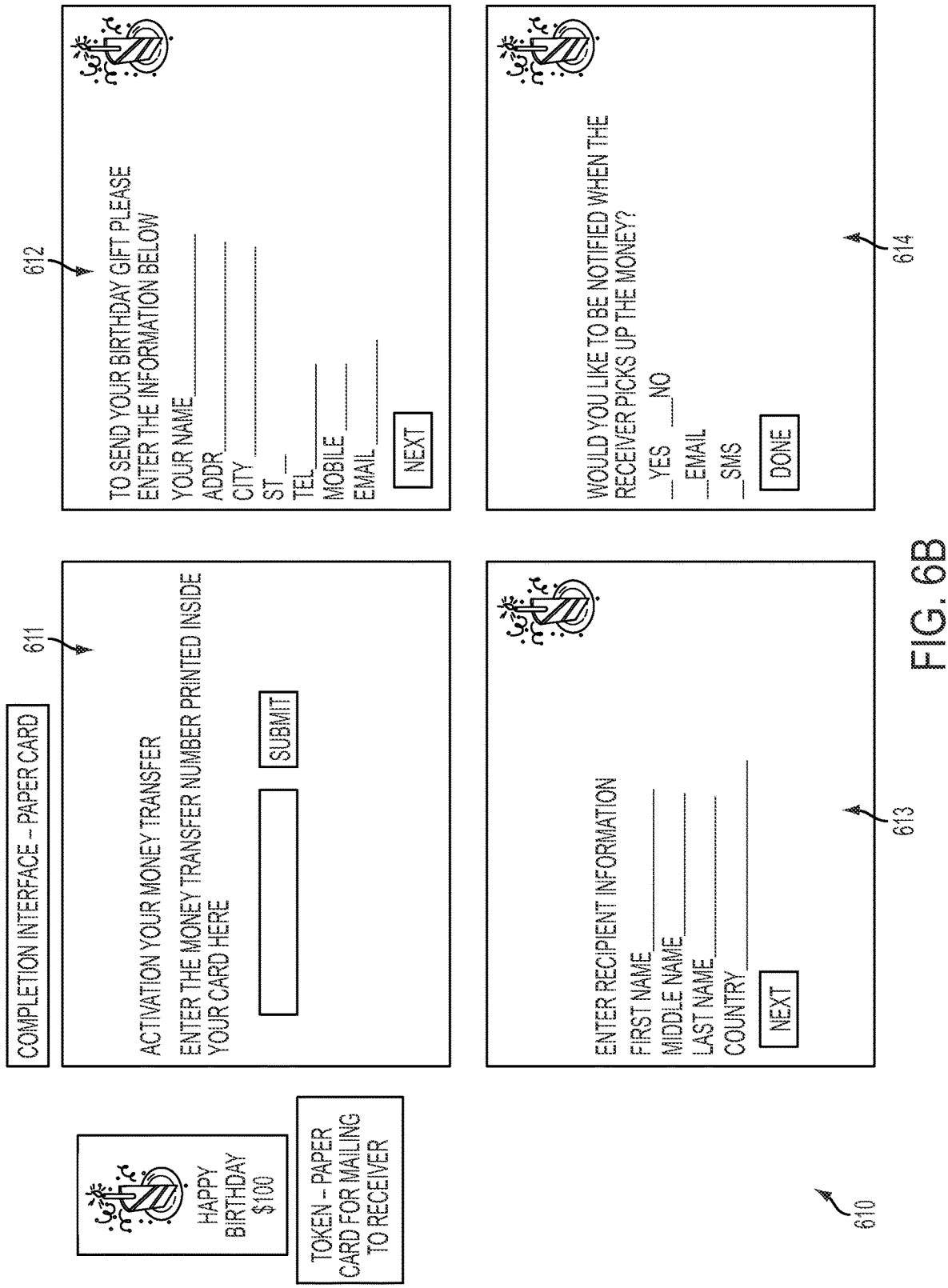
FIGS. 6B, 6C depict further examples of customer completion interface screens for two product types.
Figure 6C:
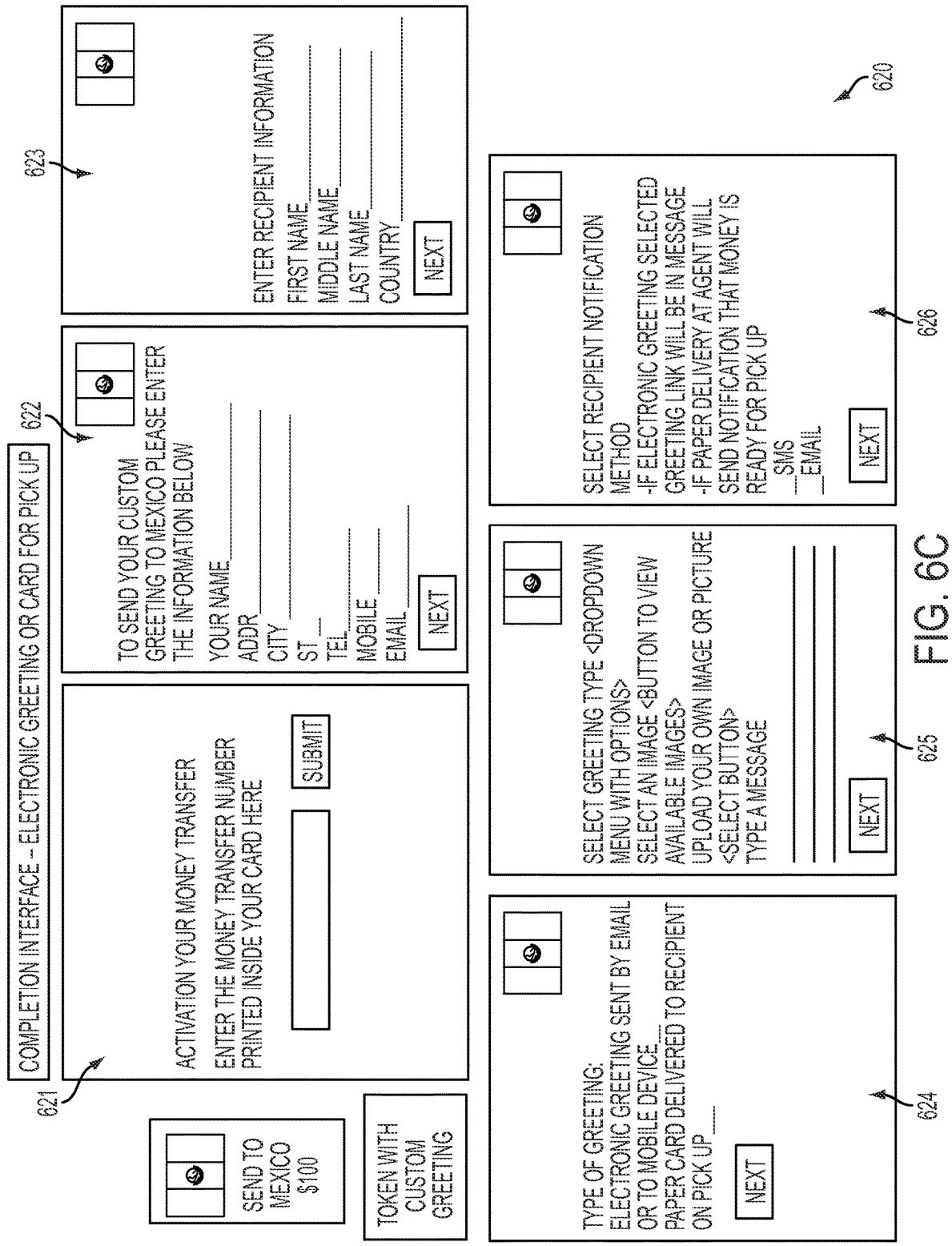

Additional examples of completion interfaces 620 and 640 are shown at FIGS. 6B and 6C, respectively. As can be seen, each of these completion interfaces 620 and 640 has certain presentation aspects (Mexican flag, birthday logo) that reflect the particular money transfer transaction or product type that the sender purchased.

As seen in FIG. 6B, the customer first sees an authentication screen 611, that references a number printed in the purchased token for sending $100 to Mexico. In screen 612, the customer is prompted to enter sender identification and contacts. In screen 613, the customer is prompted to enter recipient identification. In screen 624 (FIG. 6C), the customer selects a type of greeting (electronic or paper). In screen 625 (FIG. 6C), the type of greeting is further specified with a menu of options, selection of images, an opportunity to upload images and a place to type a message. In screen 614, the customer may select a recipient notification method, referencing associated explanations.

As seen in FIG. 6C, the customer again first sees an authentication screen 621, that references a number printed in the purchased token for sending $100 of a Happy Birthday gift. In screen 622, the customer is prompted to enter sender identification and contacts. In screen 623, the customer is prompted to enter recipient identification. In screen 626, the customer selects a receive notification and method.

As these examples demonstrate, the customer interfaces can vary widely in both their presentation elements, reflecting the purchased transaction, and in the available delivery features and associated prompts for sender selections. Thus, the completion interfaces delivered provide the opportunity to fit a wide variety of money transfer situations that may be suitable for retail purchase.

Receiving the Money Transfer:

The last phase of a retail purchase money transfer as described herein is a receive transaction. The receive transaction typically happens at an NBFI agent receive location, i.e., one that is equipped to deliver cash or other money instruments having the money transfer value. The agent receive location (FIG. 1B, 96) may also be called on to provide the delivery features selected by the sender from the delivery feature set offered at the completion interface. For some money transfers, the money transferred may be deposited in a bank account, making a recipient visit to a receive location unnecessary. However, even with an account deposit, a sender may specify delivery features that occur at the receive location of an NBFI agent. For example, the sender may want a custom printed card delivered to the recipient, even if it contains only an announcement of the account deposit.

The customer-purchaser of the retail-purchase money transfer may notify the recipient in several ways. For example, in the case of a token which is embodied in a greeting card, the customer may simply send the token to the recipient in the traditional manner of sending a greeting card. Alternatively, for greater speed, the recipient may be notified by electronic means, for example, by telephone, text message, email, etc. Such electronic notification means may include similar information as would be present on the greeting card token, so as to allow the recipient to claim the money transfer at an agent of the NBFI, for example, the transaction ID or PIN. The NBFI send system 120 interacts with the retail purchase controller 50a to communicate notification to recipients 94.

After the recipient has been notified of the money transfer sent by the retail purchase customer, either by the electronic means discussed above, by greeting card sent through the mail, or other means, the recipient may go to a local agent of the NBFI to receive the specified money transfer. (As noted, in alternative embodiments, the money transfer may be sent directly to a bank account or other account of the recipient.)

In order to receive the money transfer, the recipient may present evidence to the agent of the transaction identification number, and may also be required to provide additional information to the agent, to include, for example, appropriate identification or other personal verification information (e.g., a specified question/answer). In embodiments where a greeting card is mailed to the recipient, the recipient may show the agent the greeting card and the transaction identification number printed thereon. Alternatively, if notification of the money transfer was received electronically, the recipient may simply provide the agent with the number.

The agent of the NBFI may provide the money transferred to the recipient in various forms, for example, cash, check, money order, cash card, etc. At this time, the recipient may also be provided with other sender-selected delivery features, such as a greeting card in embodiments where the greeting card was electronically sent to the agent to be printed out for delivery along with the money transfer (online or kiosk purchases) or where the recipient receives an electronic message via NBFI send systems 120 instructed by retail purchase controller 50a.

Once the money transfer has been received by the recipient, data is returned from the receive location (agent) 96 to the NBFI indicating that the money transfer has been received. The NBFI, through the money transfer system, will then inactivate the transaction identification number and/or transaction record. Additionally, the agent may send to the NBFI a message from the receiver or a photo of the receiver taken by the agent upon receipt of the money transfer, for delivery back to the customer via NBFI send systems 120 controlled by retail purchase controller 50a. The customer may thus feel as if he/she were present during the delivery and receipt of the money transfer, further allowing the customer to view the money transfer not just as a transfer of money, but rather the giving of a gift for a purpose or an occasion.

Figure 7:
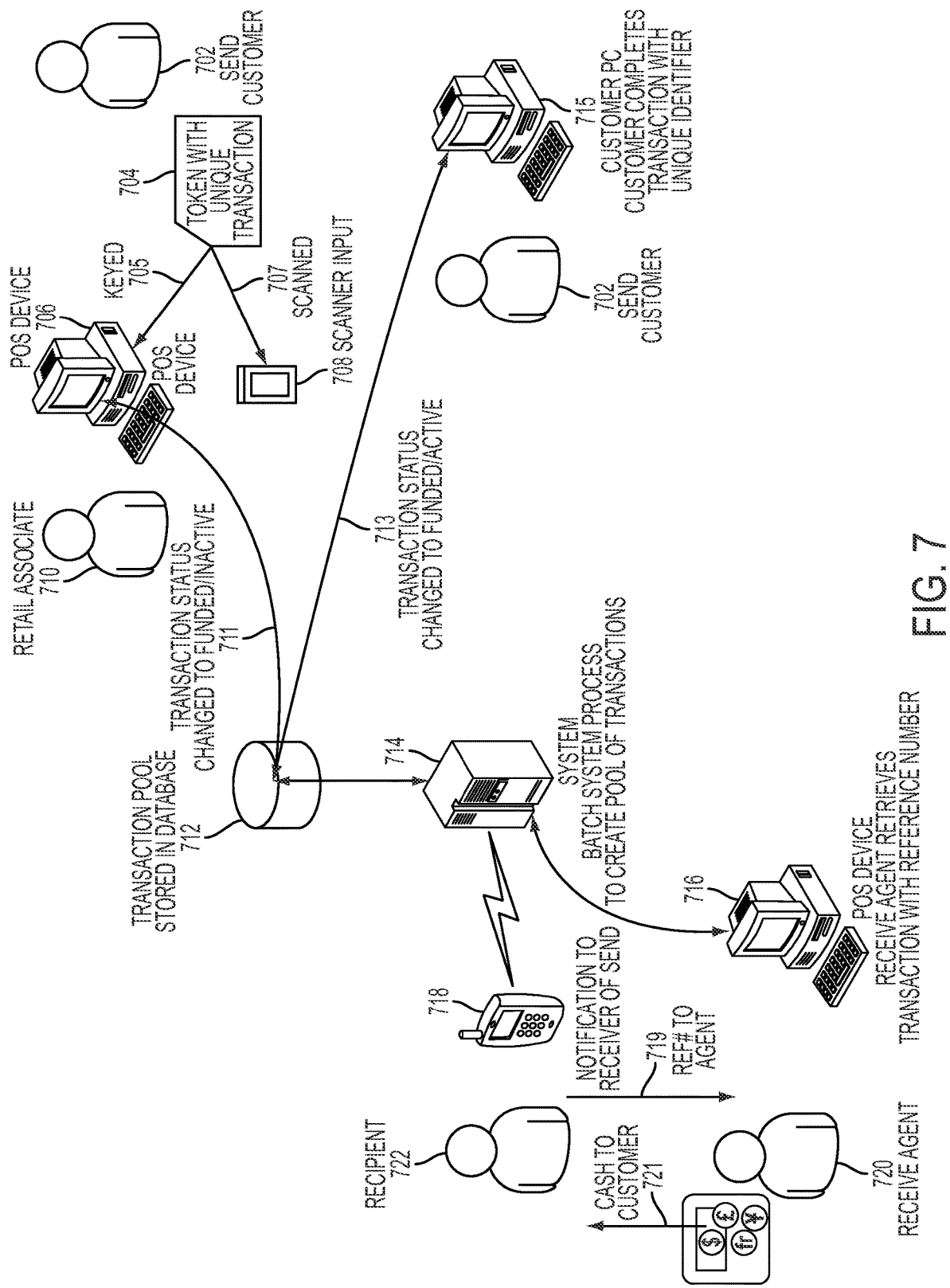
FIG. 7 is a schematic diagram of the overall operations of the present system for retail sale and sending of money transfers by an NBFI for customers.

With general reference to the embodiments previously described, an overview diagram of the system and method in accordance with the present disclosure is depicted in FIG. 7. At a retail POS, a customer 702 may select and purchase a token 704 with a unique transaction identification number. This token 704 represents one of a pool of transactions represented by data in database 712. The transaction pool may be created by software in a central data system 714 (e.g., transaction origination module 62, FIG. 1B), where a batch process is run to create the transaction pool. This token 704 and its associated transaction identification number may be alternatively keyed in 705 to a POS device 706 by a retail associate 710 or scanned in 707 via a scanner input device 708 linked to the POS device 706. After customer payment, stored transaction status associated with the token 704 in transaction pool 712 is changed from unfunded and interactive to funded and interactive 711. The POS device may transmit the code stored on one of the tokens in a purchase transaction, or data representing a send transaction identifier of such token. The data representing a send transaction identifier may be the code itself or data from which the send transaction identifier may be derived, computed or found. Transaction identification information and any additional information associated therewith may be stored in a database 712. See transaction record fields in FIG. 9.

At a later time, the customer 702 may complete the transaction using a completion interface, which may be accessed at a personal computer 715. Use of the completion interface allows the sender to change the transaction status from funded and inactive to funded and active (713) and make selections from the delivery feature set for the money transfer product type. Again, this information collected via the completion interface may be stored in a database 712.

The database at 712 interacts with a system 714 of the money transfer company, as previously discussed above and with regard to FIG. 1B (database 54). This system 714 maybe operatively connected to a POS device 716 of a receive location agent of the NBFI. Once the recipient 722 of the money transfer has been notified of the money transfer 718, the recipient 722 may provide the receive agent 720 with a reference number 719 relating to the money transfer (i.e., a transaction identifier). Upon validation of the number provided as corresponding to a funded, active transaction and the system 100 providing a payout approval, the agent 720 may provide the recipient 722 with the corresponding payment 721, which may include cash, or alternatively money order, electronic funds transfer, etc. Other deliverables as specified in sender option selection for delivery features may also be provided to recipient.

Kiosk for use with System/Method:

In addition to being able to purchase a token from a retail store aisle or other display, in some embodiments, a customer may use a vending kiosk (FIG. 1B at 19) for part or all of a retail money transfer transaction purchase. The customer may be able to generate and design his/her own token using a self-service kiosk or other similar system. In addition to selecting from among a selection of pre-made token designs, a kiosk may allow the customer to create his/her own token design, add a personalized message, or otherwise customize the token.

A kiosk may generally comprise a self-contained vending apparatus, comprising a viewing screen, and a keyboard, mouse, joystick, push-button, touch-screen, or other controls (not shown) for allowing to user to select and manipulate the design of the token. The kiosk vending apparatus may further comprise a storing means for storing blank tokens, a printing means for printing the customer's selected design on the token, and a dispensing means for dispensing the customer's designed token upon completion. Conventional vending machines with screen display and printing capability may be adapted. Optionally, a kiosk 19 may further comprise a payment means for accepting payment from a customer, and an electronic connection means for operable connection with the money transfer system 100 as described with respect to FIG. 1B. Kiosks may be located within a retail store, or within a larger retail establishment such as a mall or other shopping center.

Figure 2A:
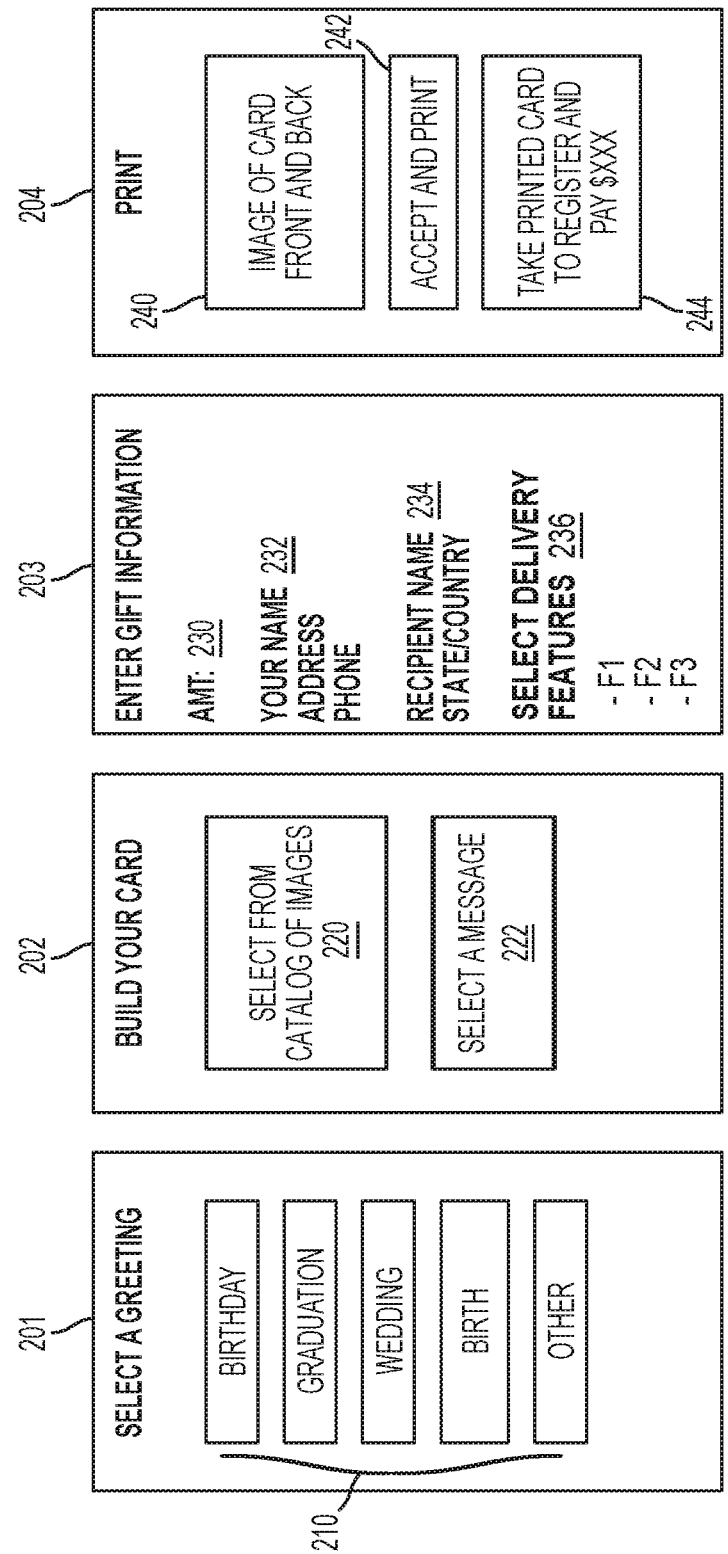
FIG. 2A depicts the screens of a kiosk for retail sale of money transfers by an NBFI to customers.

FIG. 2A depicts a simplified sequence of screens which may appear to the customer at a kiosk in accordance with the present disclosure for the creation of a money transfer token. First, at screen 201, the customer selects the type of greeting to appear on the token, for example, birthday, graduation, wedding, birth, etc. Then, as depicted at screen 202, the customer may customize and build a greeting card by selecting from among a catalog of images 220, and from among a catalog of messages 222. Alternatively, the customer may be allowed to enter his/her own message text. As will be appreciated, other aspects of the token may be designed/modified by the user. At screen 203, the customer selects the amount of the transfer 230. At screen 204, the kiosk may display the completed token design (and face and fee amounts) for customer review on screen, which may include an image of the front and back of the card 240. If the customer approves the token, he/she may accept the token design and print the token 242. The kiosk and its control software will add an SKU (e.g., in bar code form) and a transaction identifier and/or PIN to product a token similar to those of FIGS. 8A and 8B. The token may thereby be printed by the printing means of the kiosk, and dispensed to the customer via the dispensing means. The customer may then take the token to a cashier 244 for purchase of the token as described above with respect to the pre-made tokens (FIGS. 8A and 8B). Procedures for activating, completing, and sending the money transfer to the recipient in connection with the token may also be similar to as described above with the pre-made tokens.

In alternative embodiments, a kiosk may combine some or all of the design/selection of a token and purchase/completion/sending of a transaction in a single device (the kiosk). With continued reference to FIG. 2A, an additional optional procedure on screen 203 may be included after screen 202 but before screen 204 wherein the customer may enter specific send transaction information, which may include, for example, the customer's name, address, and phone number (232), and the recipient's name and state and/or country of residence (234). As shown in FIG. 2A, the token may then be reviewed, accepted, and printed with this additional information. The send transaction record resulting after purchase of a token produced with this kiosk interaction could proceed with a simplified completion interface action.

Figure 2B:
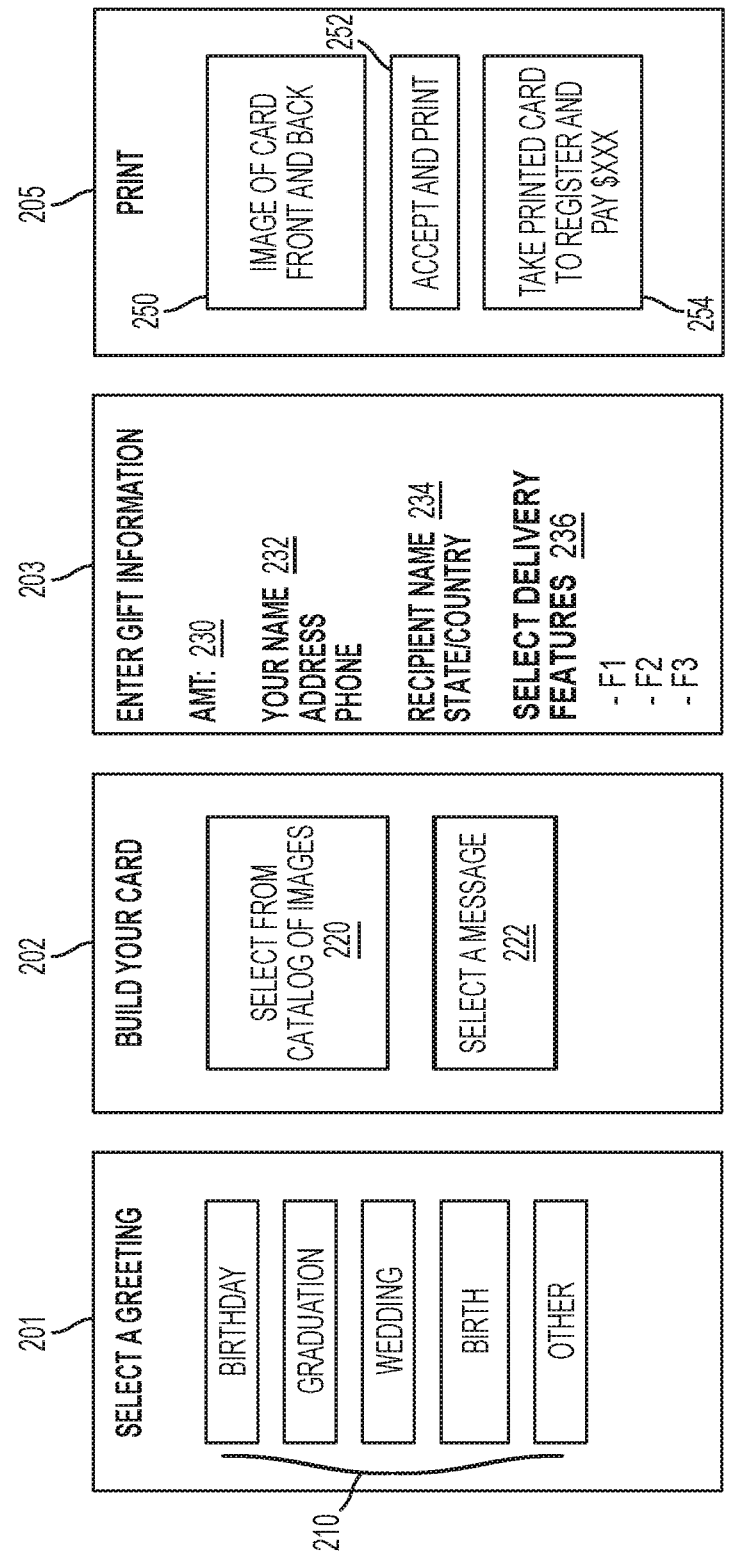
FIG. 2B depicts alternate screens of a kiosk for retail sale of money transfers by an NBFI to customers.

In further alternative embodiments, with reference now to FIG. 2B, procedures 201-203 may be completed similarly as discussed above, however, at procedure 205, after reviewing the token design, the customer may be able to substantially complete the completion process at the kiosk, rather than at a completion interface as previously described. To do that, the kiosk may present completion interface prompts at screen 203 to allow the customer to enter all of the information that otherwise would be entered separately at the completion interface. Thus, in addition to entering the money transfer amount, at screen 203 the customer may enter sender and recipient information (232, 234) and selected from a set of delivery features 236. In the embodiment of FIG. 2B, if the token design image is reviewed by and acceptable to the customer (250, 252), the customer also may accept and send the token to the recipient electronically 254, for example, to the recipient's e-mail account or other electronic means of delivery, via the electronic connection means of the kiosk. In an alternative embodiment, the token design of a greeting card may be stored for later sending to an agent of the NBFI where the recipient will receive the money transfer, and the agent may print out the greeting card at that location for delivery to the recipient at the time that the recipient picks up the money transfer.

As shown further shown at screen 205 of FIG. 2B, after the token design has been accepted and sent, the kiosk may print a receipt for the customer to take to the cashier and pay for the money transfer, thereby completing the send transaction. Alternatively, to avoid a POS checkout line, the send transaction may be completed by the customer paying for the money transfer at the kiosk itself, via the payment means, which may include, for example, a cash receiving apparatus, or a credit card scanning apparatus, or any other known payment means. In these embodiments, the kiosk would thereafter electronically update the status of the send transaction to "funded" via the electronic connection means to the money transfer system 100 as shown in FIG. 1.

On-Line Purchase:

In alternative embodiments, the customer may be able to design, purchase, activate, and send a special purpose money transfer in accordance with the present disclosure via electronic means over the internet or another communication network. In these embodiments, the customer may access a website or electronic portal of the money transfer company using, for example, a personal computer, and may design and customize a token in the manner described above with regard to the kiosk embodiments (see FIGS. 2A, 2B). In one embodiment, suitable for access by a personal computer, the website or electronic portal has the additional capability of users uploading their own images for use in creating the token.

The website/electronic portal not only allows token design but also allows transaction completion and payment, i.e., the customer may pay and enter the information as would be required by a separate completion interface, to enable activation of the money transfer. The money transfer may be paid for over the internet, through a secure payment means which may include, for example, credit card, electronic funds transfer, or other electronic payment means. In some embodiments, the customer may then print out the token using a printer, for example, connected to their personal computer, and send the token through the mail to notify the recipient in the traditional way. Alternatively, the customer may enter additional contact information of the recipient so as to allow electronic notification, for example, via e-mail, text message, or voicemail.

A benefit of this website/electronic portal over other on-line money transfers is that the website/electronic portal can provide a purchaser interface that presents money transfer transactions for defined purposes and in specified amounts. Further, the website/electronic portal may present a completion interface as described above, adapted to the money transfer product type and permitting the customer to select delivery features for the receive transaction (see FIGS. 6A-6C). It will be seen that screens already described for delivery feature selection may be used in this on-line purchase embodiment. Thus, the customer can make a money transfer for a specific purpose or occasion and can control the delivery features as in other retail POS embodiments.

Bill Payment:

The money transfer retail purchase system described above also permits bill payment. It is expected that the retailers would seek to focus on money transfer bill payment to selected common billers in the retailer area, such as utilities or a dominant retailer, restaurant chain or institution. Thus, the token for a bill payment is biller specific. The amount of a bill payment money transfer may be fixed or selectable at the retail POS. That is, the money transfer transaction may be purchased for a $50 payment to "Local Electro" or a payment in a range from $20 to $200 to "Local Electro", as specified by the purchaser at retail checkout.

With the biller already known as recipient, the primary purpose of the delivery features of the completion interface becomes to identify the sender and ensure that the payment is credited to the sender's account with the biller or an account at the biller selected by the sender (e.g., the credit account of a relative with that biller). Thus, a bill payment completion interface may elicit account numbers, address, recent transactions or other account-identifying information to help ensure the payment is properly credited, although it will not be accompanied by the usual biller-supplied billing documentation. The completion interface may also permit the sender to make the payment at a desired time, selected at a screen (not shown) or other prompt of the completion interface, after the bill payment money transfer purchase.

Within the NBFI settlement system 130, the NBFI may aggregate sender payments for deposit to a bank account of the biller, or for some other form of settlement with the biller. The sender need not know the biller bank account details. The NBFI may offer bill payment money transfer products as described herein only for a select group of billers for whom the NBFI has all necessary account or other payment details. The customer gets the convenience of making the bill payment in a retail purchase setting, plus a brief encounter with the completion interface, with no need for a checking account.

Prepayment by Retailer Option:

As noted above, the present system and method allow an NBFI to create a batch of money transfer transactions of various product types for retail sale. Payment to the NBFI follows from payment by a customer at a retail POS and the NBFI's settlement with the retailer. In an alternative embodiment, a batch of tokens prepared by an NBFI (see FIGS. 3, 4) may be purchased and prepaid by a retailer for subsequent resale to customers at the batch purchaser's retail location(s). In these embodiments, the system 100 of the present disclosure will further include a means for receiving and storing prepayment information, such as in a database 54, as part of the send transaction records, to distinguish between prepaid tokens and non-prepaid tokens. In these embodiments, rather than customer payments being directed to the NBFI, payment is retained by the retailer, as the NBFI has already been compensated for the purchase of a token by the retailer's prepayment. For example, as depicted in FIG. 1B, the settlement system 130 may be linked with prepayment account 90 via the retail purchase controller 50a. The prepayment account 90 may be adapted so as to be able to receive a bulk payment from a retail store for the purchase of a batch of tokens with associated transaction identifier numbers. Some risks associated with the money transfer transaction, for example, fraud or fake tokens, and management of exceptions and returns, may therefore be transferred away from the NBFI and on to the retailer. Further, the retailer can assign to the SKU of a purchased batch of tokens its own fee pricing. This pricing can reflect the retailer's marketplace and the risks it believes it has taken on.

The NBFI computer system 100 includes a module for recording payments received from a retail seller for the plurality of tokens. In one embodiment, the payments are equal to a face amount and a transaction fee set by the NBFI for each product type. In another embodiment, the payments are in an amount equal to or approximating the aggregated send amounts of the plurality of tokens. The time value of money may permit the NBFI to discount the face value of the send amounts or to charge a lower transaction fee in the case of retailer prepayments.

Although no payments travel to the NBFI as a result of a POS retail purchase, the system 100 still needs prompt communication from the POS devices 13 of the POS sale of a token, so that it can make the corresponding send transaction record funded and be prepared to present the completion interface and, upon sufficient completion, making the send transaction record active.

A person skilled in the art will understand that the present system will be implemented in both hardware (computers with CPUs and primary and secondary memory) and both system and application software. In particular, as seen generally in FIGS. 1B and 5, the system may be implemented on one or more general purpose computers (with appropriate communication links to hardware outside the Data Center 102) executing software programmed to perform the computations, communications and other functions described in this specification and the drawings.

While a detailed description of presently preferred embodiments have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for customized retail send transactions, the method comprising:

receiving at a computer system data representing a transaction identifier of at least one of a plurality of tokens provided for retail sale, each token representing a money transfer product type associated with a specific money transfer purpose, wherein the transaction identifier is printed or encoded on the at least one token and readable at a point of sale terminal;

creating a send transaction record linked to the at least one token's transaction identifier upon presenting the token at the point of sale terminal;

the computer system receiving from a sender the data representing the transaction identifier and presenting to the sender a completion interface, said completion interface adapted to the money transfer product type, said completion interface including presentation elements selected to invoke the specific money transfer purpose and fields for receiving send transaction information comprising:

sender identification information;

recipient identification information and notification method for sending the at least one token to a recipient; and message options related to the specific money transfer purpose;

responsive to receipt of sufficient send transaction information entered at the completion interface, storing an active, funded send transaction record in the computer system including the message options for recipient notification; and providing payout approval to an agent upon validation of the transaction identifier as corresponding to the active, funded send transaction record, when the transaction identifier is presented by the recipient to the agent.

2. The method of claim 1, wherein the transaction identifier is encoded as machine readable bar code, stored on a chip, magnetically encoded, or optically encoded on the at least one token and the data representing the send transaction identifier comprise data from which the transaction identifier is derived, computed or found.

3. The method of claim 1, wherein the at least one token is sent to the recipient electronically via email or to a mobile device.

4. The method of claim 1, wherein the sender selects a type of greeting from electronic, or paper, the type of greeting further specified with a menu of options, selection of images, an opportunity to upload images and a place to type a message.

5. The method of claim 1, further comprising a website or electronic portal presenting the completion interface, wherein the sender accesses the website or electronic portal.

6. The method of claim 5, wherein the sender accesses the website or electronic portal to create his or her own token design, add a personalized message, or otherwise customize the at least one token.

7. The method of claim 5, wherein the website or electronic portal is adapted for uploading images for creating the at least one token.

8. The method of claim 5, wherein the sender enters contact information of the recipient to allow electronic notification.

9. The method of claim 5, wherein the website or electronic portal further provides a purchaser interface that presents money transfer transactions for defined purposes and in specified amounts.

10. The method of claim 9, wherein the website or electronic portal allows token design and payment to enable activation of the money transfer transactions.

11. The method of claim 5, wherein access to the website or electronic portal is based on a kiosk operated at a retail store.

12. The method of claim 5, wherein the website or electronic portal is accessed by a personal computer, mobile computer or mobile phone communicating with the computer system.

13. The method of claim 1, wherein the elements selected to invoke the specific money transfer purpose include elements selected from the group consisting of: text, graphics, sound, video and combinations thereof.

14. The method of claim 1, wherein the sender custom designs an e-card for delivery by electronic means, selecting from among a plurality of stored images or messages or by creating a custom image or message.

15. The method of claim 14, wherein the sender specifies email, message service or multimedia message service by which the e-card is delivered.

16. A system for customized money transfer send transactions, the system comprising:

a computer system configured for:

receiving data representing a transaction identifier of at least one of a plurality of tokens provided for retail sale, each token representing a money transfer product type associated with a specific money transfer purpose, wherein the transaction identifier is printed or encoded on the at least one token and readable at a point of sale terminal;

creating a send transaction record linked to the at least one token's transaction identifier upon presenting the token at the point of sale terminal; and receiving from a sender the data representing the transaction identifier;

a website or electronic portal presenting to the sender a completion interface, said completion interface adapted to the money transfer product type, said completion interface including presentation elements selected to invoke the specific money transfer purpose and fields for receiving send transaction information comprising:

sender identification information;

recipient identification information and notification method for sending the at least one token to a recipient; and message options related to the specific money transfer purpose;

wherein the sender accesses the website or electronic portal to customize the at least one token; and memory for storing an active, funded send transaction record in the computer system responsive to receipt of sufficient send transaction information entered at the completion interface, the active, funded send transaction record including the message options for recipient notification;

wherein the computer system is further configured for providing payout approval to an agent upon validation of the transaction identifier as corresponding to the active, funded send transaction record, when the transaction identifier is presented by the recipient to the agent.

17. The system of claim 16, wherein the transaction identifier is encoded as a machine readable bar code, stored on a chip, magnetically encoded, or optically encoded on the at least one token and the data representing the transaction identifier comprise data from which the transaction identifier is derived, computed or found.

18. The system of claim 16, wherein the website or electronic portal is adapted for uploading images for creating the at least one token and the sender enters contact information of the recipient to allow electronic delivery of the one or more tokens via email or a mobile device.

19. The system of claim 16, wherein the website or electronic portal further provides a purchaser interface that presents money transfer transactions for defined purposes, and allows transaction completion and payment to enable activation of the money transfer transactions.

20. The system of claim 16, wherein access to the web site or electronic portal is based on a kiosk operated at a retail store, the kiosk adapted for the customer to create his or her own token design or add a personalized message to the at least one token.

21. The system of claim 16, wherein the website or electronic portal is accessed by a personal computer, mobile computer or mobile phone communicating with the computer system.

22. The system of claim 16, further comprising an e-card custom designed by the sender for delivery by electronic means, wherein the sender specifies email, message service or multimedia message service by which the e-card is delivered.

23. The system of claim 16, wherein the elements selected to invoke the specific money transfer purpose are selected from the group consisting of:
- a graphic that embodies the specific money transfer purpose;
- a graphic that is reflected on the at least one token;
- music that embodies the specific money transfer purpose; and
- video that embodies the specific money transfer purpose.

* * * * *